US008238754B2

(12) United States Patent
Soto et al.

(10) Patent No.: US 8,238,754 B2
(45) Date of Patent: Aug. 7, 2012

(54) SYSTEM AND METHOD FOR PLUGGABLE OPTICAL MODULES FOR PASSIVE OPTICAL NETWORKS

(76) Inventors: Alexander I Soto, San Diego, CA (US); Walter G Soto, San Clemente, CA (US)

( * ) Notice: Subject to any disclaimer, the term of this patent is extended or adjusted under 35 U.S.C. 154(b) by 40 days.

(21) Appl. No.: 12/982,872

(22) Filed: Dec. 30, 2010

(65) Prior Publication Data

US 2011/0150475 A1 Jun. 23, 2011

Related U.S. Application Data

(63) Continuation of application No. 10/886,514, filed on Jul. 6, 2004, now Pat. No. 7,925,162.

(60) Provisional application No. 60/485,072, filed on Jul. 3, 2003, provisional application No. 60/515,836, filed on Oct. 30, 2003.

(51) Int. Cl.
*H04J 14/08* (2006.01)
(52) U.S. Cl. ........................................ 398/100
(58) Field of Classification Search .............. 398/66–67, 398/98–100
See application file for complete search history.

(56) References Cited

U.S. PATENT DOCUMENTS

| | | | |
|---|---|---|---|
| 4,701,909 A | 10/1987 | Kavehrad | |
| 4,776,041 A | 10/1988 | Husbands | |
| 5,029,333 A | 7/1991 | Graves et al. | |
| 5,572,349 A | 11/1996 | Hale et al. | |
| 6,023,467 A | 2/2000 | Abdelhamid et al. | |
| 6,498,667 B1 | 12/2002 | Masucci et al. | |
| 6,778,399 B2 | 8/2004 | Medina et al. | |
| 6,788,833 B1 | 9/2004 | Brisson et al. | |
| 6,792,207 B2 | 9/2004 | Iannone et al. | |
| 6,970,461 B2 | 11/2005 | Unitt et al. | |
| 7,031,343 B1 | 4/2006 | Kuo et al. | |
| 2002/0006111 A1 | 1/2002 | Akita et al. | |
| 2002/0067529 A1 | 6/2002 | Yokomoto et al. | |
| 2002/0163921 A1 | 11/2002 | Ethridge et al. | |
| 2003/0091045 A1 | 5/2003 | Choi et al. | |
| 2003/0227926 A1 | 12/2003 | Ramamurthy et al. | |
| 2003/0236916 A1 | 12/2003 | Adcox et al. | |
| 2004/0052274 A1 | 3/2004 | Wang et al. | |

OTHER PUBLICATIONS

E. Modiano et al., "A Novel Medium Access Control Protocol for WDM-Based LAN's and Access Networks Using a . . . ", Journal of Lightwave Tech., vol. 18, No. 4, Apr. 2000.
M. Saches et al., "Fibre Channel and Related Standards", IEEE Communications Magazine, Aug. 1996.
Rodovanovic, "Ethernet-Based Passive Optical Local-Area Networks for Fiber-to-the-Desk Application", Journal of Lightwave Tech., Nov. 2003, pp. 2534-2545 vol. 21 No. 11.
Chaing et al, "Implementation of STARNET: A WDM Computer Communications Network", Journal on Selected Ares of Communications, Jun. 1996, pp. 824-839, vol. 14, No. 5.
Rawson, Eric, "The Fibernet II Ethernet-Compatible Fiber-Optic LAN", IEEE Journal of Lightwave Technology, Jun. 1985, pp. 496-501, vol. LT-3, No. 3.
E. Modiano, "WDM-Based Packet Networks", IEEE Communications Magazine, Mar. 1999.
E.Modiano, "Design and Analysis of an Asynchrounous WDM Local Area Network Using a Master/Slave Scheduler", IEEE, 1999.
R. Mauger, The Integration of ATM, SDH and PON Technology in the Access Network, Fourth IEE Conference on Telecommunications 1993.

*Primary Examiner* — Shi K Li

(57) ABSTRACT

An optical local area network includes a passive optical distribution fabric interconnecting a plurality of nodes including a first node and a plurality of remaining nodes, a hub that includes the first node and a control module, and a client network adapter coupled to each of the remaining nodes for responding to the control module. The control module controls timing for each of the client network adapters to transmit signals over the passive optical distribution fabric and distribution of signals to each of the nodes.

65 Claims, 21 Drawing Sheets

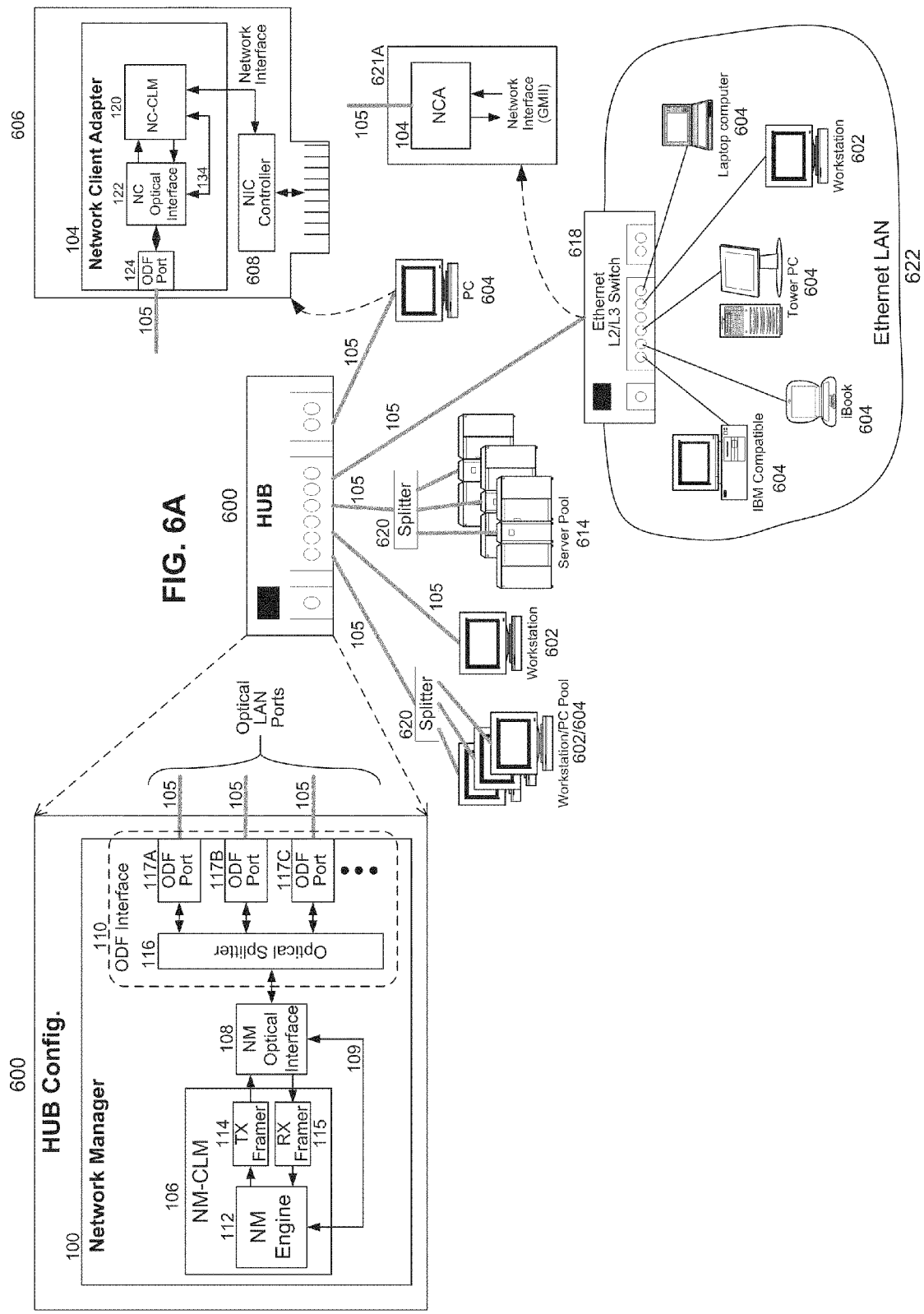

SYSTEM AND METHOD FOR PLUGGABLE OPTICAL MODULES FOR PASSIVE OPTICAL NETWORKS

CROSS-REFERENCE TO RELATED APPLICATIONS

This application is filed under 37 C.F.R. §1.53(b)(1) as a continuation claiming the benefit under 35 U.S.C. §120 of the pending patent application Ser. No. 10/886,514, "COMMUNICATION SYSTEM AND METHOD FOR AN OPTICAL LOCAL AREA NETWORK", which was filed by the same inventors on Jul. 6, 2004, now U.S. Pat. No. 7,925,162 claiming the benefit under 35 U.S.C. §119(e) of U.S. Provisional Patent Application No. 60/485,072 filed on Jul. 3, 2003, incorporated herein by reference, and U.S. Provisional Patent Application No. 60/515,836 filed on Oct. 30, 2003, incorporated herein by reference.

FIELD OF THE INVENTION

The present invention relates to optical fiber networks.

BACKGROUND OF THE INVENTION

A local-area network (LAN) is a computer network that spans a relatively small area. Most LANs are confined to a single building or group of buildings. However, one LAN can be connected to other LANs over any distance often spanning an area greater than either LAN via telephone lines, coaxial cable, optical fiber, free-space optics and radio waves. A system of LANs connected in this way is commonly referred to as a wide-area network (WAN).

Optical modules are used in applications requiring digital optical transmission such as SONET/SDH, 10 Gigabit Ethernet, Fibre Channel and DWDM running across metro access networks, wide area networks, access networks, storage area networks, and local area networks.

Optical modules integrate components used in the transmission and reception of optical signals into a single packaged subsystem. Makers of optical networking systems find optical modules attractive, because the highly integrated packaging approach can cut several months of system development and manufacturing time, consume less power and increase port densities over board-level solutions built from discrete components. But with so much functionality in one module, timely and sufficient component supply becomes even more essential for successful system delivery. Multi-source agreement (MSA) developed so systems vendors can feel more confident about getting the components they need and being able to incorporate them without costly and time-consuming system redesigns. Further with MSA, system vendors can concentrate on system architecture and not optical research and development. Optical modules can be purchased off the shelf from a choice of several suppliers.

A typical optical module 1100, as shown in FIG. 11, is composed of a: laser 1101; laser driver (LD) 1102; photo detector (PD) 1103; transimpedance amplifier (TIA) 1104; limiting amplifier (LA) 1105 and sometimes physical-layer devices 1108 such as a mux/demux with associated clock multiplier unit (CMU) and clock data recovery (CDR) functions in a serializer 1109 and deserializer 1110. A typical optical module 1100 has dual optical fibers for reception 1106 and transmission 1107 of signals and can have serial or parallel input 1111 and output 1112 pins. Optical modules have several levels of integration as shown in FIG. 12. Optical modules that contain only the optical-electrical and electri-cal-optical (o-e/e-o) components 1204, such as a laser and photo detector, are labeled discrete 1202. Optical modules that contain (o-e/e-o) 1204 and hi speed integrated circuits 1205 such as LD, TIA and LA are called transceivers 1201. Optical modules that contain (o-e/e-o) 1204, hi speed integrated circuits 1205 and Mux/Demux devices 1206 are called transponders 1200. Mux/Demux 1206 devices contain CDR and CMUs. Optical modules are ultimately connected with various interfaces to Framers and Media Access Control (MAC) devices 1207 as shown in FIG. 12.

In FIG. 13, the evolution of MSA 10 Gb/s optical modules is shown. Beginning with discrete components, followed by 300pin, XENPAK, X2, and XPAK transponders and finally with XFP transceivers. The evolution of optical modules has been to reduce the size, power, and number of components in optical modules for the purpose of increasing port densities. The very nature of the intent of the invention is contrary to the evolution of MSA 10 Gb/s optical modules in that an increase in power and number of components result while enabling point-to-multipoint networks.

SUMMARY OF THE INVENTION

In general, in one aspect, the invention includes a method for broadcasting data including receiving an incoming optical signal at a first port of a plurality of ports; converting the received incoming optical signal to an electrical signal; processing the electrical signal; converting the processed electrical signal to a broadcast optical signal; and coupling the broadcast optical signal to each of the plurality of ports.

Aspects of the invention may include one or more of the following features. Processing the electrical signal includes coupling the electrical signal to a device that processes the electrical signal according to an OSI layer-2 protocol. Processing the electrical signal includes coupling the electrical signal to a device that processes the electrical signal according to an OSI layer-3 protocol. The method further 30 includes converting an electrical client signal to the incoming optical signal. The method further includes adapting the electrical client signal from a signal conforming to an OSI layer-2 protocol. The OSI layer-2 protocol includes a media access control protocol. The media access control protocol is Ethernet or Fibre Channel. The method further includes transmitting the incoming optical signal from a network client adapter to one of the plurality of ports over an optical distribution fabric. The method further includes transmitting the broadcast optical signal from one of the plurality of ports over an optical distribution fabric; and receiving the broadcast optical signal at network client adapters in a plurality of clients. The method further includes converting the received broadcast optical signal to a second electrical signal in at least one of the clients. The method further includes selecting a frame within the second electrical signal associated with the network client adapter and adapting data in the selected frame for transmission over a network interface.

In general, in another aspect, the invention includes an apparatus including a plurality of ports; a passive optical coupler coupled to each of the plurality of ports; an optical-electrical converter in optical communication with the passive optical coupler; and a control module in electrical communication with the optical-electrical converter for scheduling slots for incoming and outgoing signals over the plurality of ports.

Aspects of the invention may include one or more of the following features. The control module is operable to schedule a slot for receiving a signal over one of the plurality of ports and to schedule a slot for broadcasting a signal over each of the plurality of ports. The apparatus includes only a single optical-electrical converter in optical communication with the passive optical coupler. The control module is coupled to a device that is operable to process an electrical signal provided by the optical-electrical converter according to an OSI layer-2 protocol. The control module is coupled to a device that is operable to process an electrical signal provided by the optical-electrical converter according to an OSI layer-3 protocol.

In general, in another aspect, the invention includes an optical local area network including a plurality of optical waveguides; a network manager that includes an optical-electrical converter in optical communication with the plurality of optical waveguides; and a control module in electrical communication with the optical-electrical converter for scheduling slots for incoming and outgoing signals transmitted over the plurality of optical waveguides; and a plurality of network client adapters coupled to the plurality of optical waveguides, each network client adapter including an optical-electrical converter for processing transmitted and received optical signals at a client.

Aspects of the invention may include one or more of the following features. The optical local area network further includes a passive optical coupler coupled to each of the plurality of optical waveguides. The network manager further includes a passive optical coupler coupled to each of the plurality of optical waveguides. The control module is operable to schedule a slot for receiving a signal over one of the plurality of optical waveguides and to schedule a slot for broadcasting a signal over each of the plurality of optical waveguides. The control module is operable to dynamically schedule a slot for receiving a signal over one of the plurality of optical waveguides in response to a message from one of the network client adapters. The control module is operable to determine a response delay between the optical-electrical converter and one of the network client adapters. The control module is coupled to a device that is operable to process an electrical signal provided by the optical-electrical converter according to an OSI layer-2 protocol. The control module is coupled to a device that is operable to process an electrical signal provided by the optical-electrical converter according to an OSI layer-3 protocol. Each of the network client adapters is operable to convert an electrical client signal to an optical signal for transmission over one of the optical waveguides. Each of the network client adapters is operable to adapt the client signal from a signal conforming to an OSI layer-2 protocol. The OSI layer-2 protocol includes a media access control protocol. The media access control protocol used by a network client adapter is Ethernet or Fibre Channel. Each of the network client adapters is operable to convert a received optical signal to an electrical signal. Each network client adapter is operable to select a frame within the electrical signal associated with the network client adapter. The optical local area network further includes a client that includes a network interface card, the network interface card including one of the network client adapters. The client is selected from the group consisting of a workstation, a personal computer, a disk storage array, a server, a switch, and a router.

In general, in another aspect, the invention includes an optical local area network including a passive optical distribution fabric interconnecting a plurality of nodes including a first node and a plurality of remaining nodes; a hub that includes the first node and a control module; and a client network adapter coupled to each of the remaining nodes for responding to the control module; wherein the control module controls timing for each of the client network adapters to transmit signals over the passive optical distribution fabric and distribution of signals to each of the nodes.

Aspects of the invention may include one or more of the following features. The control module is operable to schedule a slot for receiving a signal from one of the remaining nodes and to schedule a slot for broadcasting a signal to each of the remaining nodes. The control module is operable to dynamically schedule a slot for receiving a signal from one of the remaining nodes in response to a message from one of the network client adapters. The control module is operable to determine a response delay between the hub and one of the network client adapters. The control module is coupled to a device that is operable to process signals according to an OSI layer-2 protocol. The control module is coupled to a device that is operable to process signals according to an OSI layer-3 protocol. Each of the network client adapters is operable to convert an electrical signal to an optical signal for transmission over the passive optical transmission fabric. Each of the network client adapters is operable to adapt a signal conforming to an OSI layer-2 protocol. The OSI layer-2 protocol includes a media access control protocol. The media access control protocol used by a network client adapter is Ethernet or Fibre Channel. Each of the network client adapters is operable to convert a received optical signal to an electrical signal. Each network client adapter is operable to select a frame within the electrical signal associated with the network client adapter. The optical local area network further includes a client that includes a network interface card, the network interface card including one of the network client adapters. The client is selected from the group consisting of a workstation, a personal computer, a disk storage array, a server, a switch, and a router.

In general, in another aspect, the invention includes an optical local area network including a hub; a plurality of external nodes interconnected by a passive optical distribution fabric, wherein the external nodes are located external to the hub, and the hub is operable to control traffic across all nodes; adaptors at each external node responsive to hub instruction; and an interface coupled to the hub coupling signals received from any individual external node for distribution to all external nodes.

Aspects of the invention may include one or more of the following features. The hub includes an internal node coupled to the passive optical distribution fabric. The hub is operable to measure response delay between the hub and external nodes. The hub is operable to allocate slots for external nodes dynamically. Slot allocations are made to guarantee external nodes have a minimum bandwidth. The optical local area network further includes splitters coupled between the hub and external nodes. Traffic arriving at one or more external nodes includes Ethernet traffic. Traffic arriving at one or more external nodes includes Fibre channel traffic. The hub includes an optical module. At least one of the external nodes is located within an optical module external to the hub.

Implementations of the invention may include one or more of the following advantages. A network manager in an optical local area network can provide switching functions of a hub, a switch or a router. A switch configuration in which network managers are aggregated enables a high performance network in a compact apparatus. Connectivity of network managers and network client adapters to existing conventional routers and switches using industry standard form factor optical modules enables a high performance network upgrade with minimal new equipment. A network client switch can support multiple physical layer ports without necessarily requiring a Layer-2 MAC or switching elements and the associated routing tables and packet memory. The number of optical transceivers and switching elements used to sustain the same number of computing nodes in a LAN via a point-to-multipoint optically coupled network configuration is reduced, thus saving the majority of expense described above.

Aspects of an embodiment of the invention includes enabling Media Access Control (MAC), Transmission Convergence Layer (TC-Layer) and Physical Layer (PHY-Layer) functionality via a plurality of discrete electronic components in an optical module, which can interface to existing Physical Media Attachment (PMA) layer devices or to devices via the Media Independent Interface (MII). This enables a consolidation of a plurality of network equipment layers resulting in cost savings.

BRIEF DESCRIPTION OF THE DRAWINGS

FIGS. 6A - 6C are diagrams of optical local area networks utilizing a hub configuration.

FIGS. 9 and 10 are block diagrams of switches.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1:
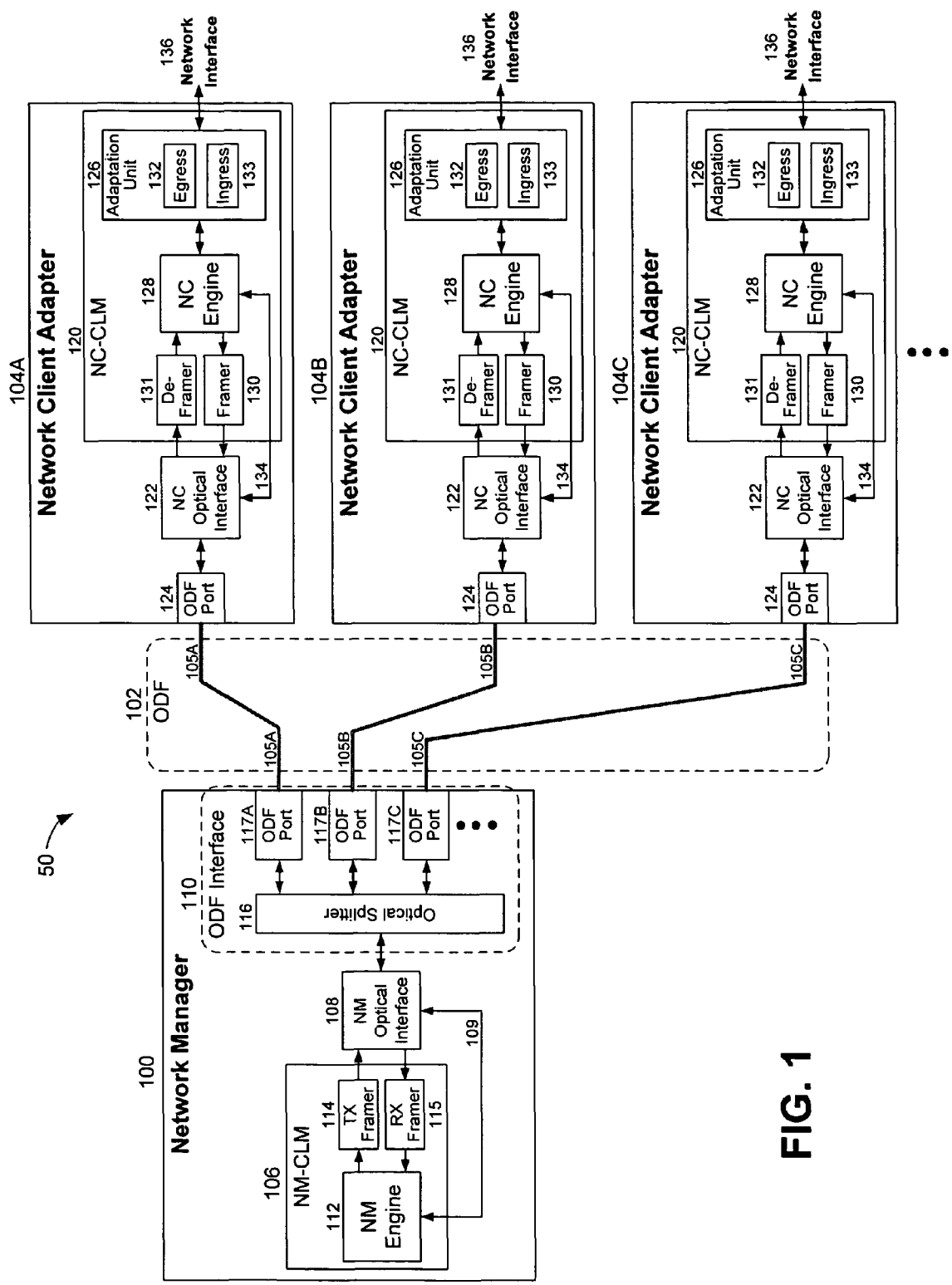
FIG. 1 is a block diagram of an optical local area network.

Referring to FIG. 1, a high-level schematic of an optical local area network 50 includes a network manager (NM) 100 at the head end of a passive optical distribution fabric (ODF) 102. The NM 100 acts as a central transmission point and an overall controlling device for the optical local area network 50. On another end, the ODF 102 is terminated by a plurality of (in one implementation, generally similar) network client adapters (NCAs) 104A, 104B, 104C. Herein the NCA 104A, NCA 104B, NCA 104C, are also referred to collectively as NCAs 104. Though three NCAs 104 are shown more or fewer NCAs may be included in the optical local area network 50.

The NM 100 transmits/receives data to/from the NCAs 104 in the form of modulated optical light signals of known wavelength through the ODF 102. The transmission mode of the data sent over the ODF 102 may be continuous, burst or both burst and continuous modes. Both NM 100 and NCAs 104 may transmit light signals having a same wavelength. In one implementation, the light signals are polarized and the polarization of light transmitted by the NM 100 is perpendicular to the polarization of the light transmitted by the NCAs 104. Alternatively, the transmissions can be made in accordance with a time-division multiplexing scheme or similar protocol.

In another implementation, bi-directional wavelength-division multiplexing (WDM) may be used. Bi-directional WDM is herein defined as any technique by which two optical signals having different wavelengths may be simultaneously transmitted bi-directionally with one wavelength used in each direction over a single fiber. In yet another implementation, bi-directional dense wavelength division multiplexing (DWDM) may be used. Bi-directional DWDM is herein defined as any technique by which more than two optical signals having different wavelengths may be simultaneously transmitted bi-directionally with more than one wavelength used in each direction over a single fiber with each wavelength unique to a direction. For example, if bi-directional WDM is used, the NM 100 may transmit data to an NCA 104A, 104B, 104C utilizing a first wavelength of modulated light conveyed via a fiber 105A, 105B, 105C, respectively, in the ODF 102 and, similarly, the NCAs 104A, 104B, 104C may transmit data via the same fiber 105A, 105B, 105C, respectively, in the ODF 102 to the NM 100 utilizing a second wavelength of modulated light. Because only a single fiber is used (e.g., between the NM 100 and each respective NCA 104), this type of transmission system is commonly referred to as a bi-directional transmission system. Although the optical local area network 50 illustrated in FIG. 1 includes an NM 100 in communication with a plurality of NCAs 104 using a plurality of fibers, other implementations of optical local area networks 50 may be used. In some implementations, the NCAs 104 are generally similar. In other implementations, the NCAs 104 may differ in one or more aspects.

The NM 100 includes network management communication logic and memory (NM-CLM) 106 block, a network management optical interface (NM Optical Interface) 108 block and an optical distribution fabric interface (ODF Interface) 110 block. The NM-CLM 106 includes a network manager engine (NM Engine) 112 block, a transmit framer (Tx Framer) 114 block and a receive framer (Rx Framer) 115 block.

The NM Engine 112 is a control module that performs various processing and scheduling functions of an NM 100. The Tx Framer 114 frames outgoing data from the NM Engine 112 in accordance with a framing protocol that is in-use. The Rx Framer 115 receives incoming frames and recovers appropriate data and messages to pass on to the NM Engine 112. The NM Optical Interface 108 is controlled by the NM-CLM 106 using, for example, bus 109. The NM Optical Interface 108 converts electrical signals carrying data from the Tx Framer 114 to optical signals, for example, by modulating a laser (not shown) included in the NM Optical Interface 108 and transmitting the laser output to the ODF interface 110. The NM Optical Interface 108 also receives optical signals from the ODF interface 110 and converts the optical signals to electrical signals carrying data that is then transferred to the Rx Framer 115. Thus, the NM Optical Interface 108 functions as an "optical-electrical converter" that can convert a signal from an optical signal to electrical signal or from an electrical signal to an optical signal.

The ODP Interface 110 includes an optical splitter 116 and a plurality of ODF Ports 117A, 117B, 117C, etc. For example, the optical splitter 116 can be a 1:n splitter (where n is at least 2) that splits light coming from the NM Optical Interface 108 into n portions of light coupled into n optical ports, respectively. The optical ports (e.g., ODP Ports 117) can be coupled to one or more optical waveguides. In one implementation, each ODP Port 117 is coupled to an optical waveguide. The optical waveguides can be, for example, single mode or multimode fibers that guide received/transmitted light to/from respective ODP Ports 117A, 117B, 117C, etc. The 1:n splitter (or equivalently, n:1 combiner) also directs light from any of the ODP Ports 117A, 117B, 117C, etc. received over one of the optical waveguides to the NM Optical Interface 108. ODP Ports 117A, 117B, 117C, etc. include optical fiber connector sockets (e.g., SC, LC, PC, ST, or MU connector sockets) for coupling to the optical waveguides.

The ODP 102 can include any of a variety of passive optical components including optical fibers (e.g., single mode fibers, multimode fibers), optical connectors, fiber splices, passive branching components (e.g., passive splitters) and passive optical attenuators.

In this implementation, the NCAs 104 each include a network client communication logic and memory (NC-CLM) 120 block, a network client optical interface (NC Optical Interface) 122 block and an ODP port 124. The NC-CLM 120 block includes an Adaptation Unit 126 block, a network client engine (NC Engine) 128 block, a transmit framer (Framer) 130 block and a receiver framer (Deframer) 131 block. The NC Engine 128 is a control module that performs various functions associated with an NCA 104, such as responding to messages from the NM 100. The Framer 130 frames outgoing data from the NC Engine 128 in accordance with a framing protocol that is in-use. The Deframer 131 receives incoming frames and recovers appropriate data and messages to pass on to the NC Engine 128. The adaptation unit 126 receives and transmits data and messages in the form of frames, packets or cells according to one or more external protocol(s). External controls, data and messages can be received using the network interface 136. The responsibilities of the adaptation unit 126 may include providing buffering, data and/or message filtering and translation between the external protocol(s) and the protocol of the optical local area network 50. The adaptation Unit 126 includes egress queue 132 block and ingress queue 133 block. Egress and ingress queues 132, 133 can be of the form of memory and are used for buffering receive and transmit data and messages, respectively. The adaptation unit 126 can filter out or drop data and/or messages that are not intended to egress through its network interface 136. Filtering can be based on the destination address of the data and/or messages according to the external protocol in-use. Additionally, the adaptation unit 126 can filter out or drop data and/or messages that are not intended to ingress through its network interface 136. Filtering can be based on equal values for the source and destination addresses of the data and/or messages according to the external protocol in-use. The NC Optical Interface 122 is controlled by the NC-CLM 128 using bus 134. The NC Optical Interface 122 converts electrical signals carrying data from the Framer 130 block to optical signals, for example, by modulating a laser (not shown) included in the NC Optical Interface 122 and transmitting the laser output to the ODF port 124. The NC Optical Interface 122 also receives optical signals from the ODF port 124 and converts the optical signals to electrical signals carrying data that is then transferred to the Deframer 131 block. The ODF port 124 includes an optical fiber connector socket (e.g., an SC, LC, FC ST, or MU connector socket).

The NCAs 104 can be coupled to data link layer devices (not shown) or physical layer devices (not shown) using network interface 136. The data link layer devices and physical layer devices are network devices that operate at a Layer-2 or Layer-1 respectively, according to the Open Systems Interconnect (OSI) 7-layer reference model. Furthermore, these network devices may comply with industry standard specifications such as IEEE 802.3 and Fibre Channel (incorporated herein by reference). Consequently, the network interface 136 may be an MII, GMII, XGMII, XAUI or SPI type interface. Other Layer-2 and Layer-1 type interface specifications may also be used.

The optical local area network 50 transfers data between an NM 100 and the NCAs 104 in the form of downstream frames (NM 100 to NCAs 104) and upstream "virtual frames" (NCAs 100 to NM 104). Downstream frames from the NM 100 are transmitted into the ODF 102 in an essentially continuous sequence of constant period frames. In one implementation, downstream frames have a period of 125 μs, and transfer data downstream at a rate of approximately 10 Gb/s, although other periods and rates may be used. The ODP Interface 110 and potentially the ODF 102 split the downstream transmissions passively so that all NCAs 104 receive the frames in a generally broadcast manner. In the upstream direction, separate transmissions from the plurality of NCAs 104 are transmitted as burst transmissions or in slots which are combined in a virtual frame so that the separate burst transmissions do not collide when they arrive at the NM 100. In one implementation, the virtual upstream frames have essentially the same period as the downstream frames, and upstream data transmissions are transmitted at a rate approximately equal to the downstream rate. Alternatively, different upstream and downstream rates may be used.

Figure 2:
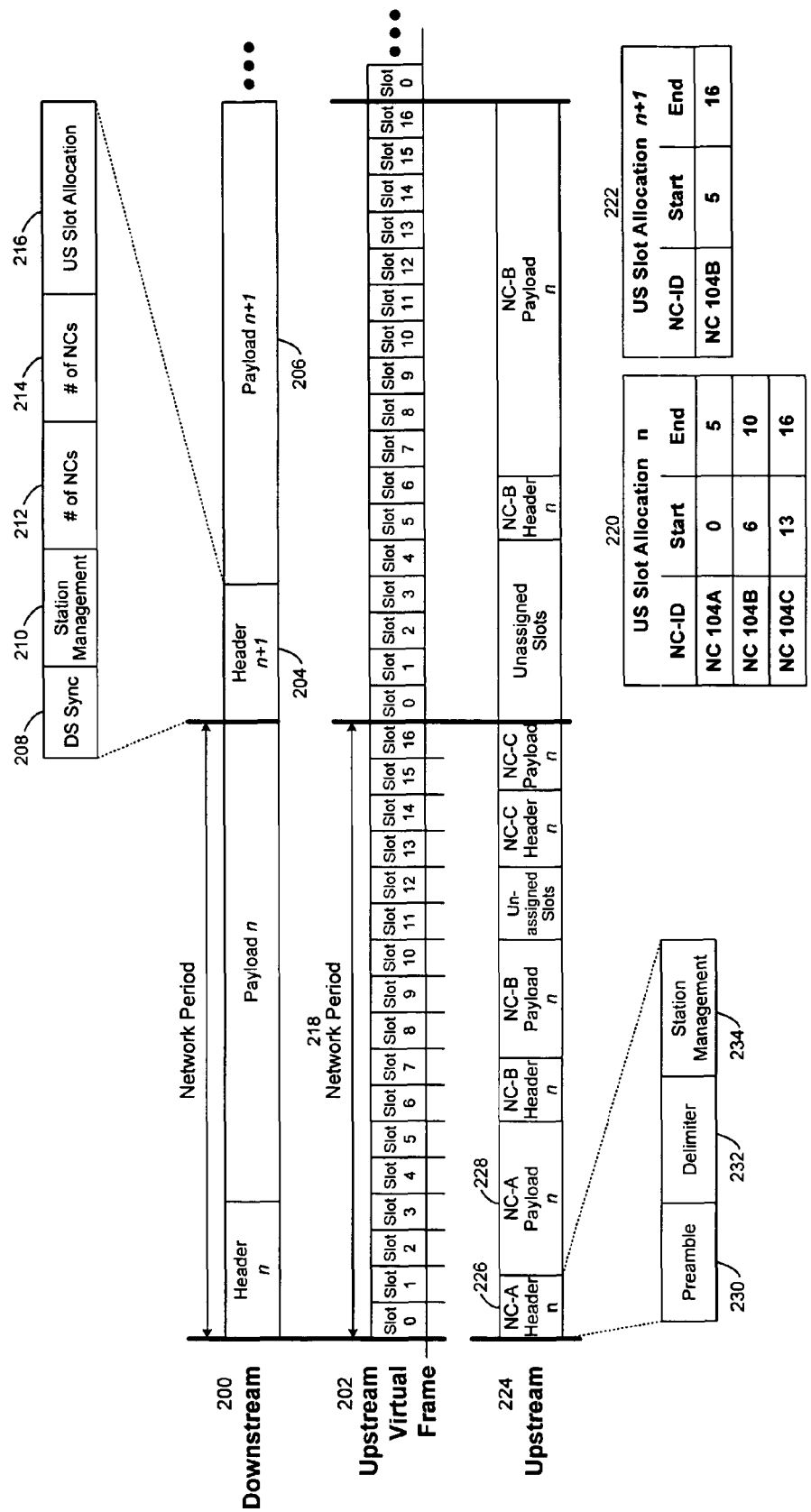
FIGS. 2, 3A and 3B are schematic diagrams showing frame structures.

FIG. 2 is a schematic timing and framing diagram, showing overall structure of a downstream frame 200, and a virtual upstream frame 202 in an implementation of a framing protocol. Referring now to FIGS. 1 and 2, each downstream frame 200 includes a header 204 and a payload section 206. The downstream header 204 includes a downstream synchronization (DS Sync) 208 section, a station management 210 section, two sections containing the number of NCAs 104 in communication with the NM 100 (# of NCAs) 212, 214 and an upstream slot allocation (US slot allocation) 216 section. The DS Sync 208 section includes a consecutive sequence of bits that enables receiving NCAs 104 to identify a beginning of the downstream frame 200 and thus acts as starting marker for frame timing throughout the optical local area network 50. The number of NCAs 104 in communication with the NM is sent twice 212, 214 to ensure correct interpretation of the US slot allocation section 216. The order of downstream header sections 210, 212, 214, 216 after a DS Sync 208 may differ in other implementations.

During each network period 218 defined by respective adjacent downstream headers, each NCA 104 is able to send upstream data. The virtual upstream frame 202 is partitioned into slots, where a "slot" corresponds to a fixed number of bits or a fixed length of time within a virtual frame. For each network period 218, the NM 100 allocates each NCA 104 respective slots within which an NCA is able to transmit data upstream. Each slot allocation includes a start slot number and end slot number (also referred to as start time and end time), relative to the starting marker defined by a DS Sync 208 from the next network period after an NCA 104 receives a slot allocation. In alternative implementations, a start slot number and a length of time during which a specific NCA 104 is permitted to transmit may be sent instead of a start slot number and an end slot number. Slot allocation start and end numbers are allocated within the virtual upstream frame so that slot allocations do not overlap, ensuring that there are no collisions of data from different NCAs 104 at the NM 100. The allocations can be determined by the NM Engine 112 based on total upstream bandwidth requests and can be communicated to NCAs 104 in the downstream frame US slot allocation 216 section. The US slot allocation 216 section includes start and end slot numbers pertaining to and identified to specific NCAs 104 (as shown in 220 and 222). Slot allocations assigned to NCAs 104 can be dynamic and may be changed from network period to network period.

The upstream frame 224 includes header 226 and payload 228 sections. The header 226 includes a preamble 230 section, a frame delimiter (Delimiter) 232 section and a station management 234 section. The preamble 230 section includes a consecutive sequence of bits designed to aid an NM 100 in synchronizing to the bit clock of a respective transmitting NCA 104. The Delimiter 232 includes a consecutive sequence of bits designed to aid an NM 100 in synchronizing to and recognizing the beginning of an upstream frame 224.

Figure 3A:
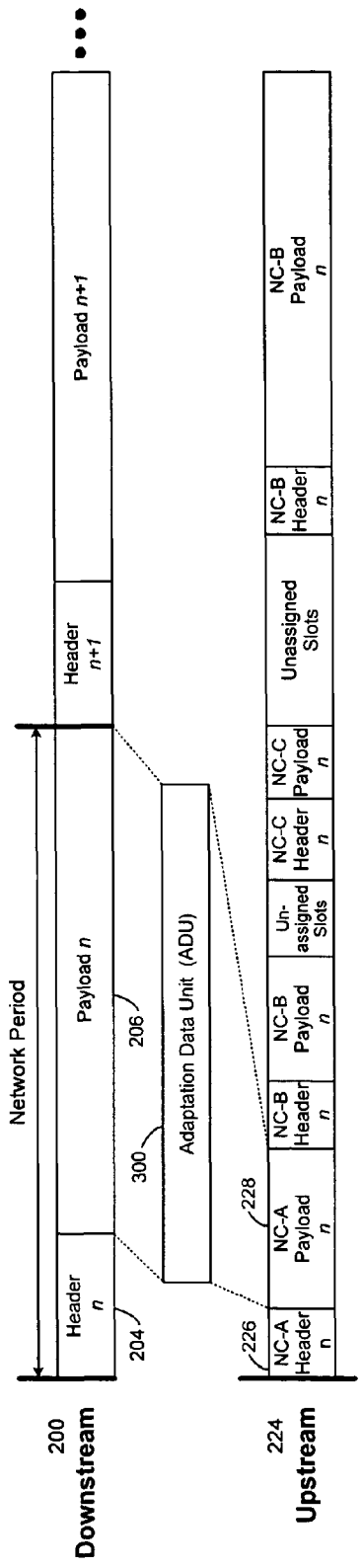

Each downstream frame 200 and upstream frame 224 includes a payload section 206,228 respectively, in which data to and from NCAs 104 (from the network interface 136) are transferred. FIG. 3A is a schematic showing the payload in downstream and upstream framing, showing that the payload of both upstream and downstream may contain a single adaptation data unit (ADU) 300. ADUs 300 are output units of data from an adaptation unit 126, where the adaptation unit 126 has processed data received from the network interface 136 for transfer across the optical local network 50. For example, in one implementation the adaptation unit 126 receives Ethernet media access control frames (MAC frames) via a GMII interface (as an implementation for the network interface 136) and removes the MAC frame's preamble and start of frame delimiter (SFD) fields with the remaining fields of the MAC frame encapsulated in an ADU 300. Additionally, in one implementation the adaptation unit 126 receives Fibre Channel (FC) FC-2 frames through a serial interface (as an implementation of the network interface 136) and removes the FC-2 frame's start of frame and end of frame fields, with the remaining fields of the FC-2 frame encapsulated in an ADD 300.

In another example, the adaptation unit 126 can receive IEEE 802.3 MAC frames via a GMII interface and form an ADD 300 with the entire MAC frame included (i.e., encapsulate the entire MAC frame). In yet another example, the adaptation unit 126 can receive FC-2 frames through a serial interface (as an implementation for the network interface 136) and form an ADD 300 with the entire FC-2 frame included (i.e., encapsulate the entire FC-2 frame).

Figure 3B:
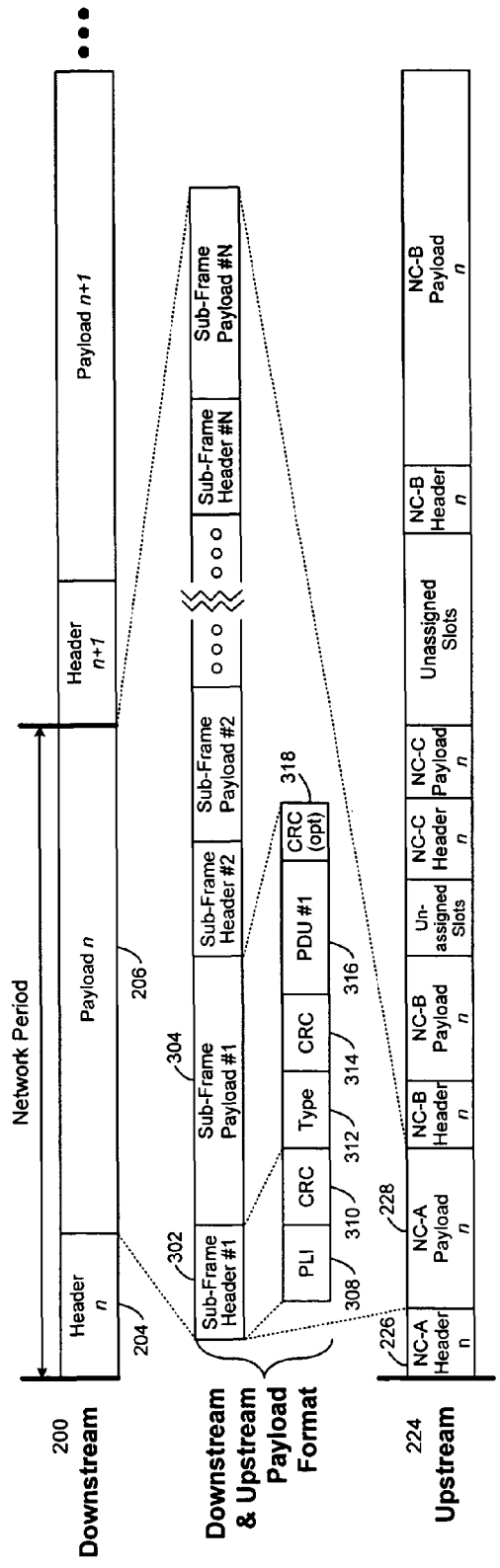

In one implementation, the payload 204, 232 of downstream frames 200 and upstream frames 224 may include multiple consecutive sub-frames. Referring to FIGS. 1 and 3B, a sub-frame includes a sub-frame header 302 section and a sub-frame payload 304 section. A sub-frame header 302 section includes a payload length indicator (PLI) 308 and cyclic redundancy check (CRC) 310 section that covers the PLI 308. CRC sections, although not shown, may be used in the downstream 200 and upstream 224 frames as well. The sub-frame payload 304 section includes a type 312 section, a CRC 314 that relates to the type 312 section, a payload data unit (PDU) 316 and optionally a CRC 318 that relates to the PDD 316. The PLI 308 gives an indication of the length, e.g., in bits, of the sub-frame payload 304 section immediately following the sub-frame header 302. The type 312 section gives an indication of the type of data in the PDU 316. An adaptation unit 126 may receive data from a mixture of protocols essentially simultaneously (as described below) and the use of sub-frames allows the data to be transferred across the network ensuring quality of service or class of service. An adaptation unit 126 uses sub-frames by placing received data in the PDU 316, indicating the type of data received in the type 312 section and entering the length of the sub-frame payload 304 in the PLI 308 section.

Figure 4:
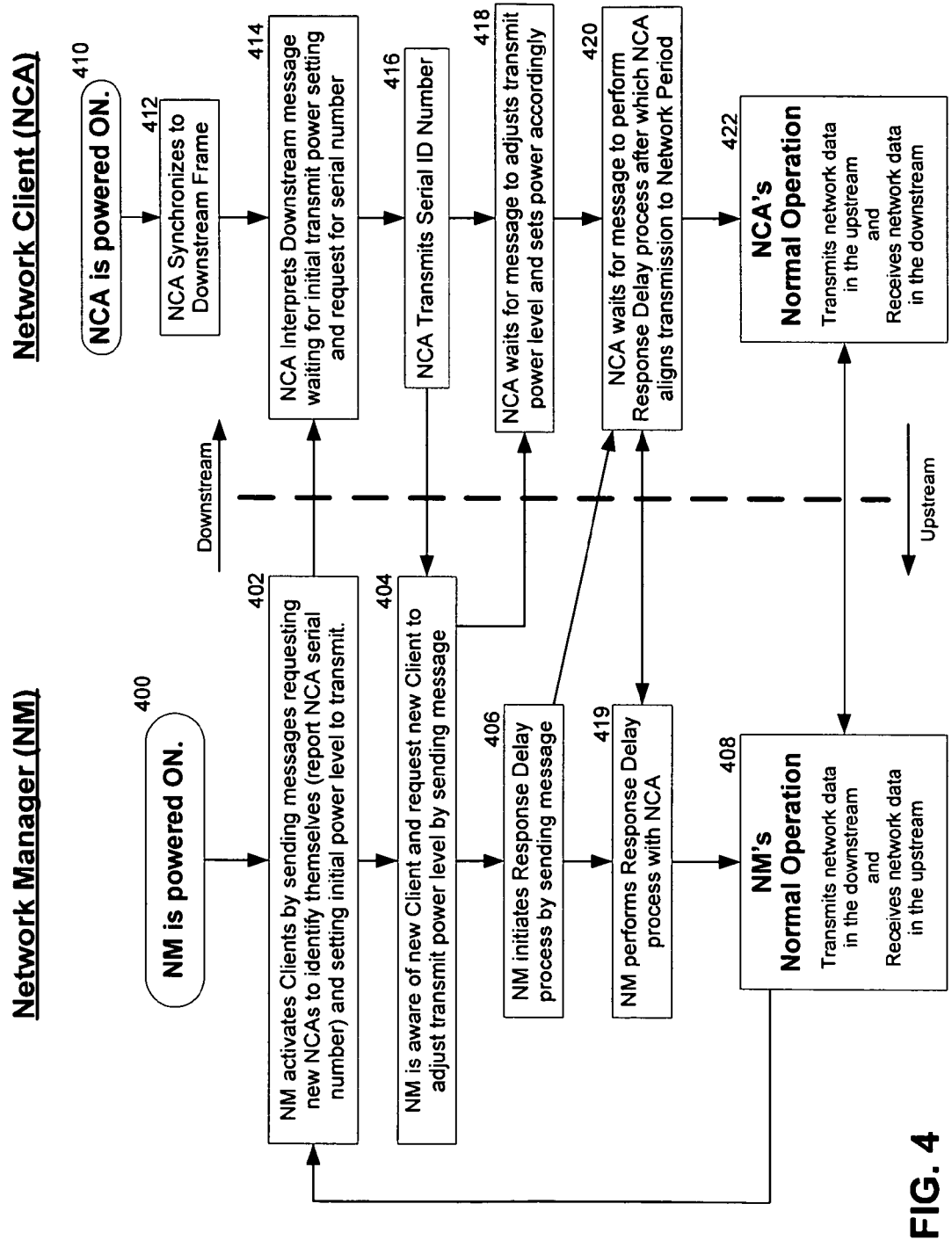
FIG. 4 is a flowchart for a network operating process.

The optical local area network 50 operates according to an exemplary process illustrated in FIG. 4. Referring now to FIGS. 1 and 4, after an NM 100 is powered on 400, the NM 100 sends out 402 one or more message(s) requesting new NCAs 104 (NCAs 104 that the NM 100 is unaware of) to identify themselves by reporting to the NM 100 with their respective serial number. The NM 100 also sends out 402 network parameters including initial NCA transmit power levels using, for example, a station management message(s). The NCAs 104 respond using slot allocation(s) given by the NM 100 for new NCAs 104 to respond. After successfully receiving new NCA serial numbers, the NM 100 assigns each new NCA 104 a network identification number (NC-ID) and requests 404 the new NCA 104 to adjust its transmitting power level. In one implementation, the NM 100 sends these requests in a station management message. The respective new NCAs 104 use the assigned NC-ID to interpret specific messages of concern (i.e., addressed) to a given NCA 104. The NM 100 initiates 406 a response delay process to determine the delay in responses between the new NCA and the NM 100. After performing 419 the response delay process, the NM 100 enters normal operation in which network data is transmitted and received 408 across the optical local area network 50.

When an NCA 104 is powered on 410, the NCA 104 attempts to synchronize 412 to downstream frames by searching for the DS Sync 208. After successful downstream synchronization, the NCA 104 interprets 414 network parameters received via downstream station management messages 404, adjusts its initial transmit power level and awaits instructions (e.g., a message) for new NCAs 104. The instructions include a slot allocation for new NCAs 104 to respond 416 to the NM 100 with the NCA's 104 serial number. Once the NCA 104 has sent its serial number the NCA 104 is then assigned an NC-ID by the NM 100. The NCA 104 then enters a waiting loop (e.g., for a station management message from the NM 100 to adjust its transmit power level). In response to a request to set transmit power level, the NCA 104 adjusts the transmit power level 418. The NCA 104 then enters a waiting loop again (e.g., until receipt of a message from the NM 100 to initiate a response delay process). Upon receipt of an instruction to begin a response delay process, the NCA 104 can, in cooperation with the NM 100, determine the delay between the respective network elements (not shown as part of the process flow). The details of the response delay process are described in greater detail below. After the NCA 104 and NM 100 complete the response delay process, the NCA 104 may adjust 420 its alignment with the network period to account for downstream and upstream transmission delay. The NCA 104 then enters its normal operation state in which network data is received and transmitted 422.

Figure 5:
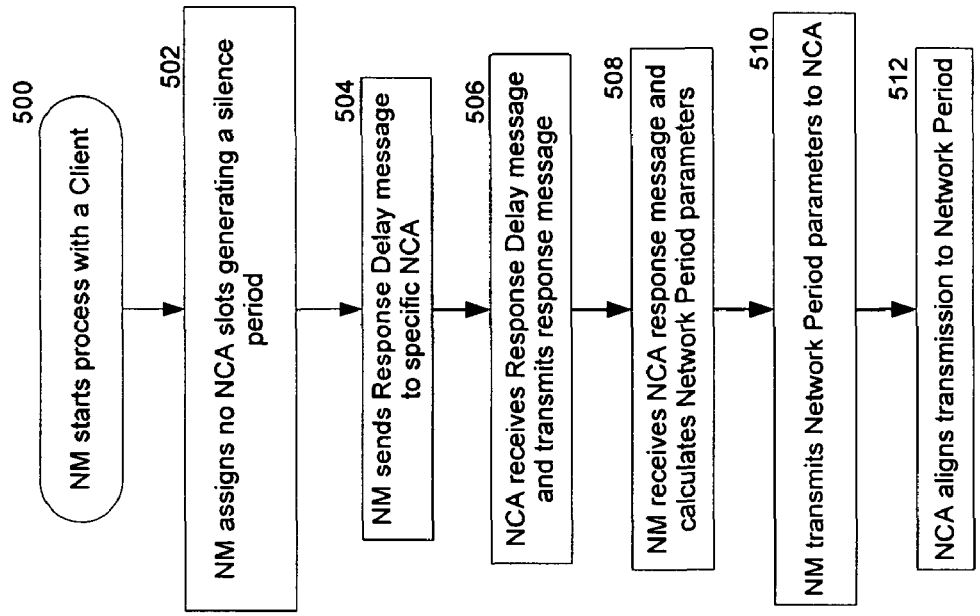
FIG. 5 is a flowchart for a response delay process.

FIG. 5 shows one implementation for executing a response delay process 500. The response delay process 500, is a process to determine the delay in NM downstream transmission to NM upstream reception of a message or network data transmission. Referring now to FIGS. 1, 2 and 5, the NM 100 starts 501 the delay process with a new NCA 104 or with an NCA 104 that may cause upstream transmission collisions. The NM 100 assigns one or more slot(s) to the target NCA 104 (i.e., the new NCA or one NCA that may cause a collision in upstream communication) to respond with a response delay message. The NM 100 generates 502 a silence period in the upstream virtual frame 202 (e.g., by not assigning or granting any slots for that period) around the slot(s) assigned to the target NCA 104. The silence period ensures no upstream collisions will occur. The NM 100 sends 504 a message to the NCA 104 to respond with a response delay message and informs the NCA 104 of its slot(s) assignment to respond. Thereafter, the NCA 104 responds 506 to the NM 100 at the appropriate slot time. The NM 100 receives the NCA 104 response delay message and calculates 508 the transmission delay. In one implementation, the NM 100 transmits 510, the result of the response delay calculation to the NCA 104 and the NCA 104 aligns 512 itself to the proper network period.

The NM 100 may assign, schedule or grant slot allocations in a number of ways (e.g. according to fixed time-division multiplex or statistical time-division multiplex schemes). In one implementation the slot allocations are scheduled to give the NCs 104 a guaranteed minimum upstream transfer rate. The rate may be determined by dividing the maximum upstream data rate by the number of NCAs 104. In another implementation, the NM 100 receives status information about the NCAs 104 egress 132 and ingress 133 queue status. The NM 100 can schedule slot allocations that best minimize the depth of the egress 132 and ingress 133 queues to minimize transmission delays ensuring quality of service (QOS) or class of service (COS).

FIGS. 6A-6C, 7A-7C and 8 are illustrations of implementations of the optical local area network 50. In one implementation shown in FIG. 6A, an NM 100 may function in a hub configuration 600 networking clients including workstations 602, personal computers (PC) 604 and Ethernet switches 618 together using the Ethernet protocol. The workstations 602 and PCs 604 are connected to the hub configuration 600 with a network interface card (NIC) 606 containing an NCA 104 and a NIC controller 608. In one implementation of the NIC 606, the NIC controller 608 includes a GMII interface, an Ethernet MAC and a peripheral component interconnect (PCI) bus interface. The NCA 104 communicates to the NIC controller 608 through the GMII interface. Ethernet switches 618 are connected to the hub configuration 600 with a network adaptor 621A containing an NCA 104. Ethernet switches 618 can be conventional Ethernet switches. In one implementation of the network adaptor 621A, the network interface 136 is a GMII interface.

Figure 6B:
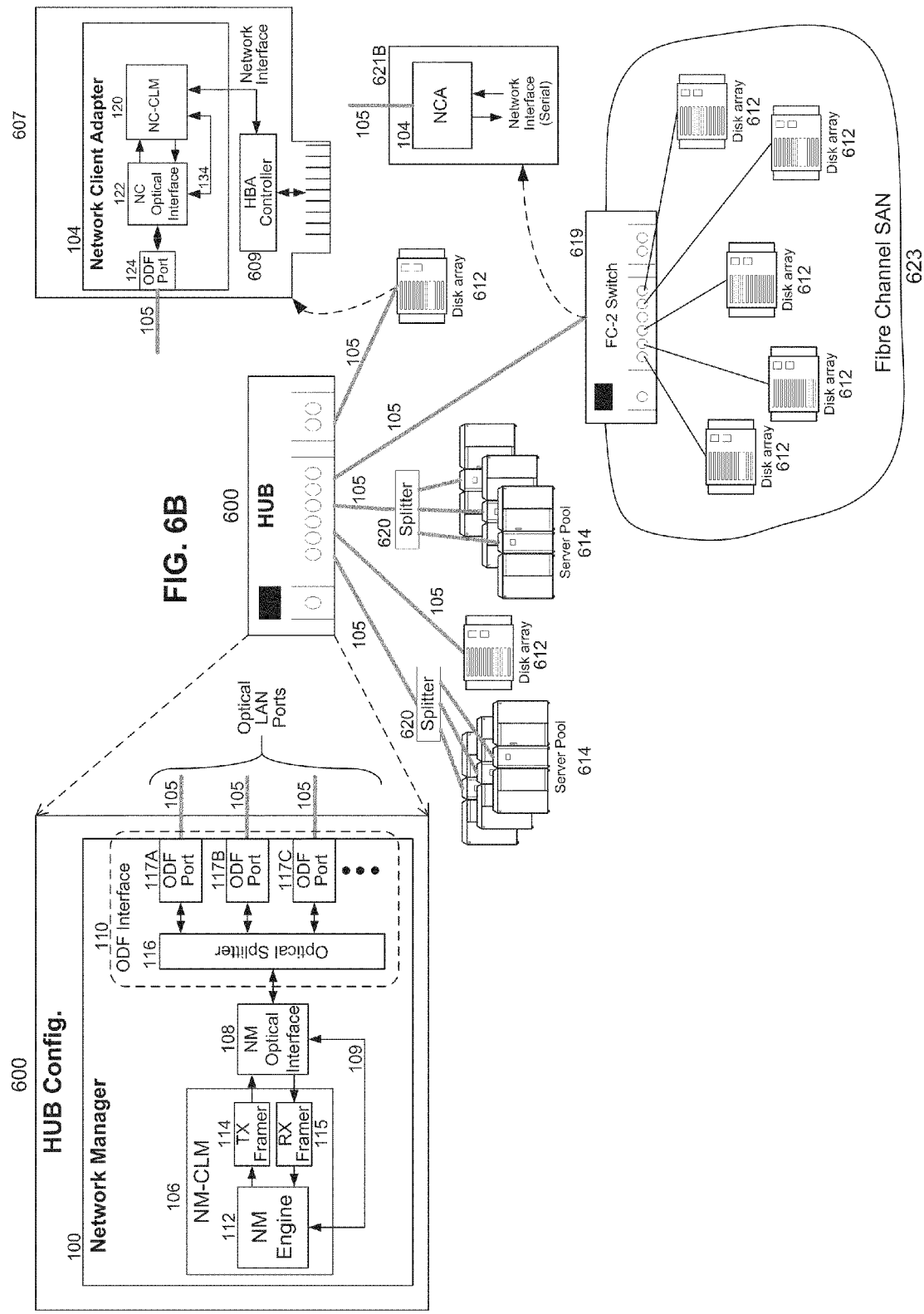

In another implementation shown in FIG. 6B, the hub configuration 600 can network disk storage array devices 612, servers 614 and FC switches 619 together using the Fibre Channel (FC) protocol. This implementation may be described as a Storage Area Network (SAN). The disk storage array devices 612 and servers 614 are connected to the hub configuration 600 with a host bust adaptor (HBA) 607. In one implementation of HBA 607, the HBA controller 609 includes a serial interface, FC controller and a PCI bus interface. FC switches 619 are connected to the hub configuration 600 with a network adaptor 621B containing an NCA 104. FC switches 619 can be conventional FC switches. In one implementation of the network adaptor 621B, the network interface 136 is a serial interface.

Figure 6C:
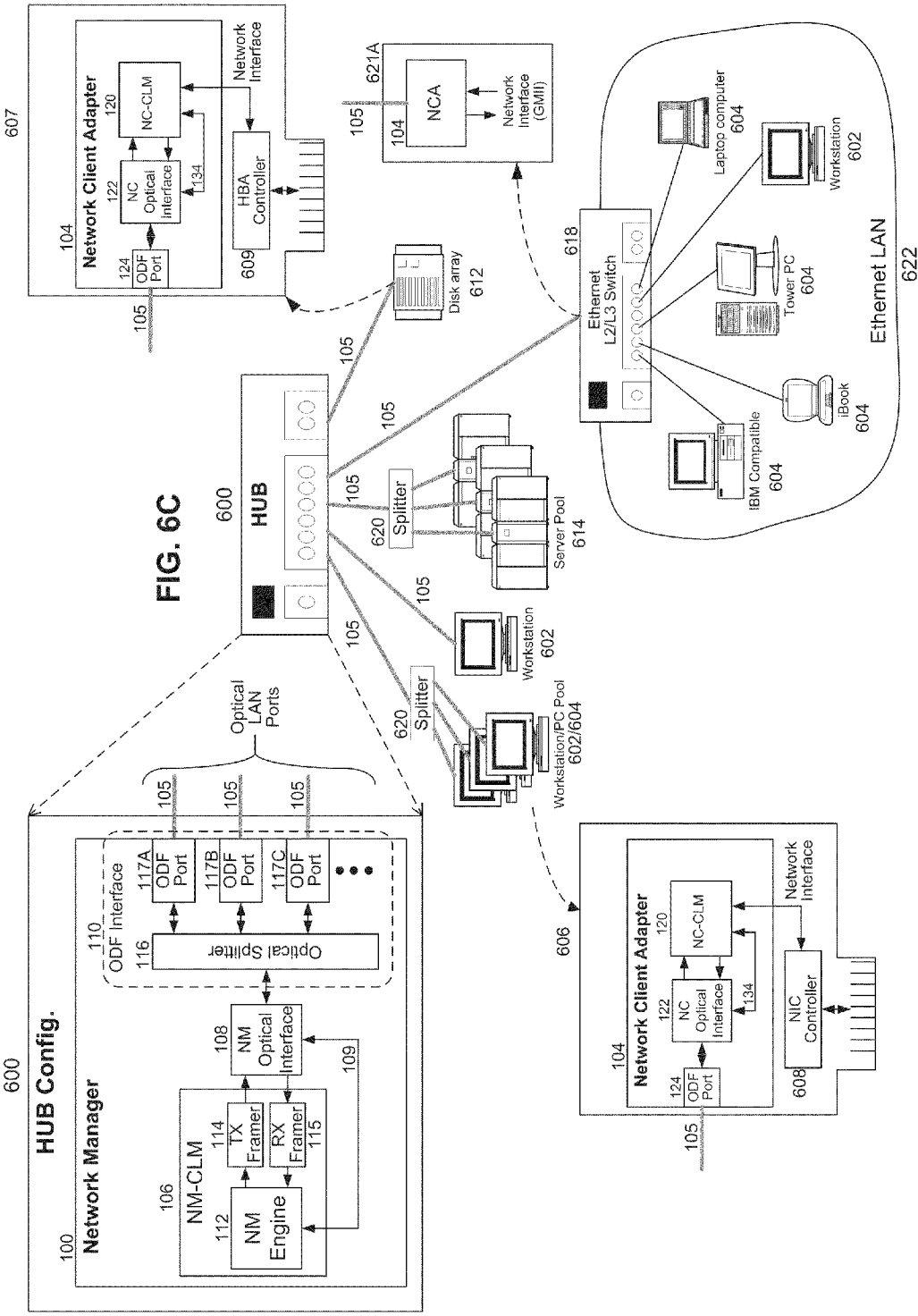

In yet another implementation of the optical local area network 50 shown in FIG. 6C, the hub configuration 600 may network clients such as workstations 602, PCs 604, disk storage array devices 612, servers 614 and switches 618, 619 (FIG. 6B) using both Ethernet and FC protocols concurrently. NICs 606 can connect a particular client to the hub configuration 600 using the Ethernet protocol. HBAs 607 can connect a particular client to the hub configuration 600 using the FC protocol. For example, workstations 602, PCs 604 and switches 618 can communicate with the hub configuration 600 using Ethernet protocol while disk storage array devices 612 and servers 614 can communicate with the hub configuration 600 using FC protocol. The ODF 102 (not shown) of the optical local area network 50 can include splitters 620. Hub configuration 600 can also connect to a switch 618 using an adaptor card 621A. Adaptor card 621A includes an NCA 104 with a respective network interface 136 (e.g., GMII, XAUI, Serial). Switch 618 may be, for example, a switch in a conventional Ethernet LAN 622.

Figure 7A:
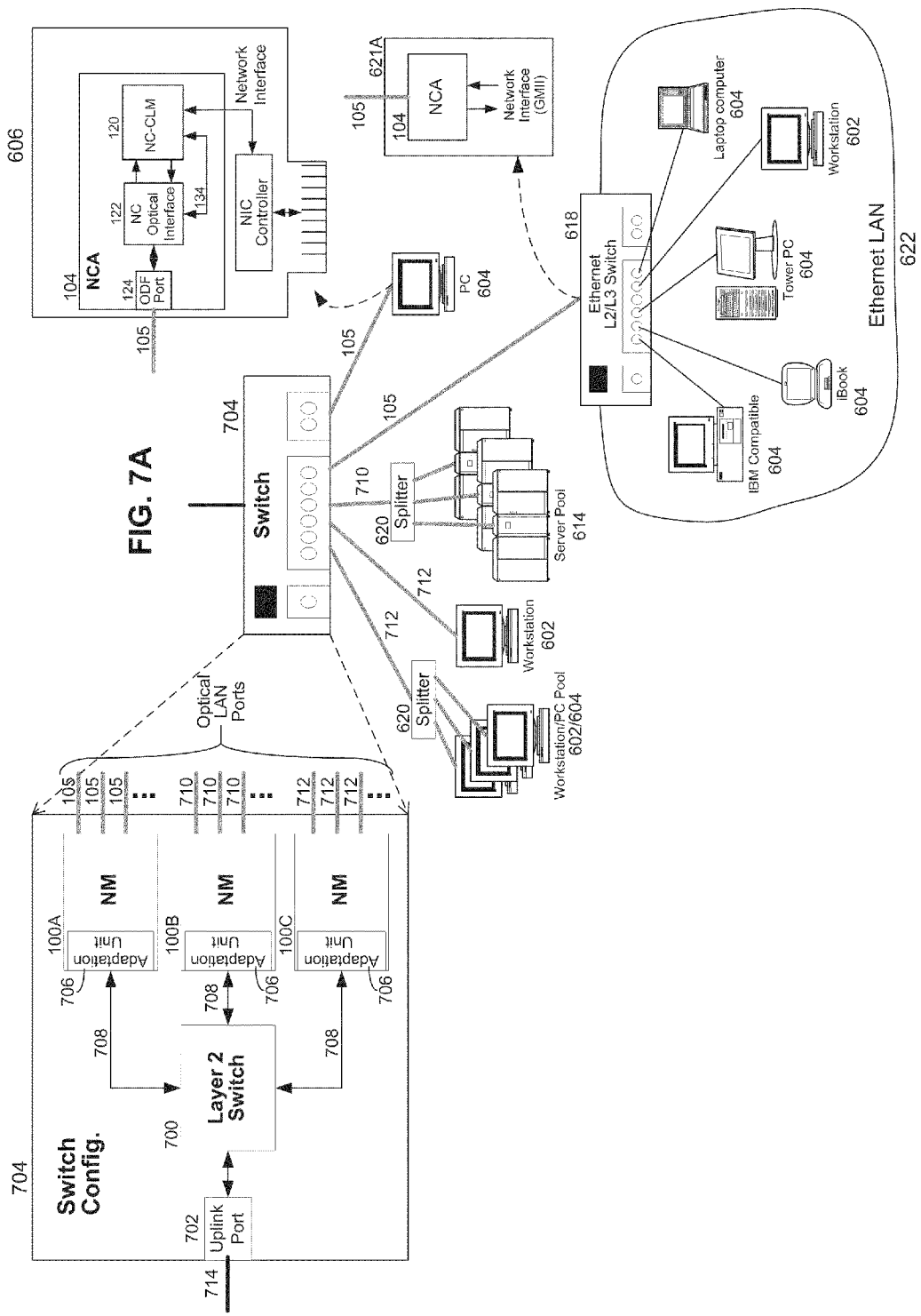
FIGS. 7A-7D are diagrams of optical local area networks utilizing a switch configuration.

One or more NMs 100 can interface to a switching device (e.g., a Layer-2 switch or a Layer-3 switch) to process frames from the various NCAs 104 according to a communication protocol of the switching device. Referring to FIG. 7A, a switch configuration 704 includes multiple NMs 100A, 100B, 100C in communication with a Layer-2 switch device 700 which is in further communication with an uplink port 702. In alternative implementations, the Layer-2 switch device 700 may be in communication with a plurality of uplink ports (not shown). Though three NMs 100A, 100B, 100C are shown more or fewer NMs 100 may be in communication with a Layer-2 switch device 700 included in the switch configuration 704. Each NM 100A, 100B, 100C includes an adaptation unit 706 in communication with a NM Engine (not shown). The adaptation unit 706 receives and transmits data and messages in the form of frames, packets or cells according to the Layer-2 switch device 700 via a switch interface 708. Adaptation unit 706 can provide buffering, data and/or message filtering and translation between the protocol of the Layer-2 switch device 700 and the protocol of the optical local area network 50. The adaptation unit 706 includes an egress queue block (not shown) and an ingress queue block (not shown). Egress and ingress queues can be of the form of memory and are used for buffering receive and transmit data and messages, respectively. In one implementation of the NMs 100A, 100B, 100C, all upstream traffic received by an NM 100 is passed through the switch interface 708 to the Layer-2 switch device 700. All downstream traffic transmitted by an NM 100 is received by the NM 100 through the switch interface 708. In another implementation upstream traffic received by an NM 100 can be filtered based on destination address to either pass data and/or messages back to one or more NCAs 104 multiplexed in downstream traffic (e.g. hairpinning) or to the Layer-2 switch device 700 through the switch interface 708. The fiber connections 105 form a first ODF for connecting NM 100A with one or more NCAs. The fiber connections 710 form a second ODF for connecting NM 100B with one or more NCAs. The fiber connections 712 form a third ODF for connecting NM 100C with one or more NCAs.

In one implementation of an optical local area network 50 shown in FIG. 7A, the switch configuration 704 is used to network workstations 602, PCs 604 and a Ethernet switch 618 together using the Ethernet protocol with appropriate NICs 606 as described above. The switch configuration 704 includes a Layer-2 switch (e.g., Layer-2 switch device 700) that implements an Ethernet MAC and switching functions. The optical fibers 105, 710, 712 connecting the workstations 602, PCs 604 and Ethernet switches 618 to the switch configuration 704 can be associated with different NMs 100A, 100B, 100C depending on which fiber connections are used. The uplink port 702 of switch configuration 704 can connect to an Ethernet switch and/or router (not shown).

Figure 7B:
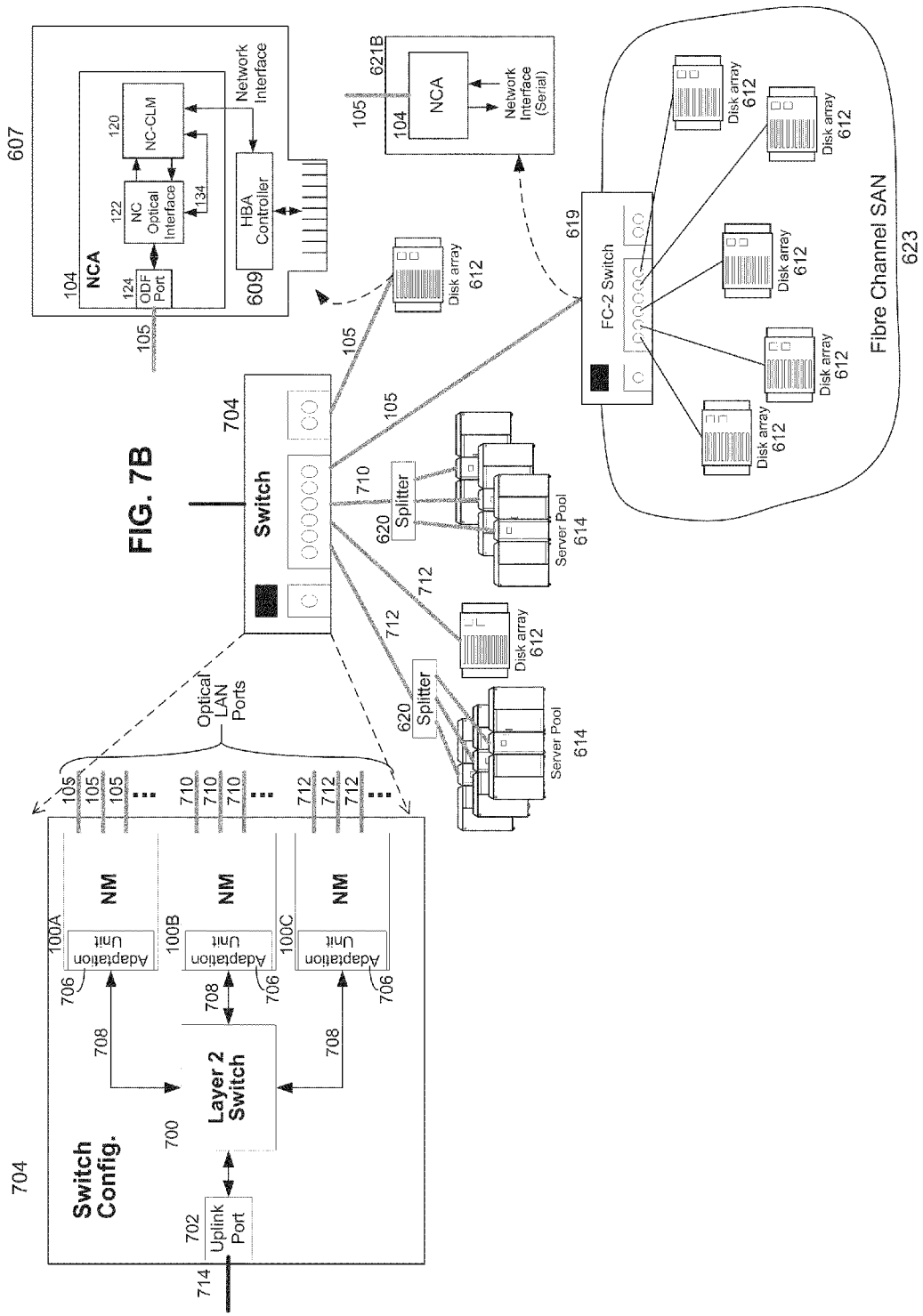

In another implementation of an optical local area network 50 shown in FIG. 7B, the switch configuration 704 is used to network one or more disk storage array devices 612, servers 614 and FC-2 switches 619 using, for example, the FC protocol with appropriate HBAs 607 as described above. This implementation may also be described as a Storage Area Network (SAN). The switch configuration 704 includes a Layer-2 switch (e.g., Layer-2 switch device 700) that implements an FC-2 controller and switching functions. The optical fibers 105, 710, 712 connecting the disk storage array devices 612, servers 614 and FC-2 switch 619 to the switch configuration 704 can be associated with different NMs 100A, 100B, 100C depending on which fiber connections are used. The uplink port 702 of switch configuration 704 may connect to an FC-2 switch and/or router (not shown). FC-2 switches 619 can be a conventional FC-2 switch.

Figure 7C:
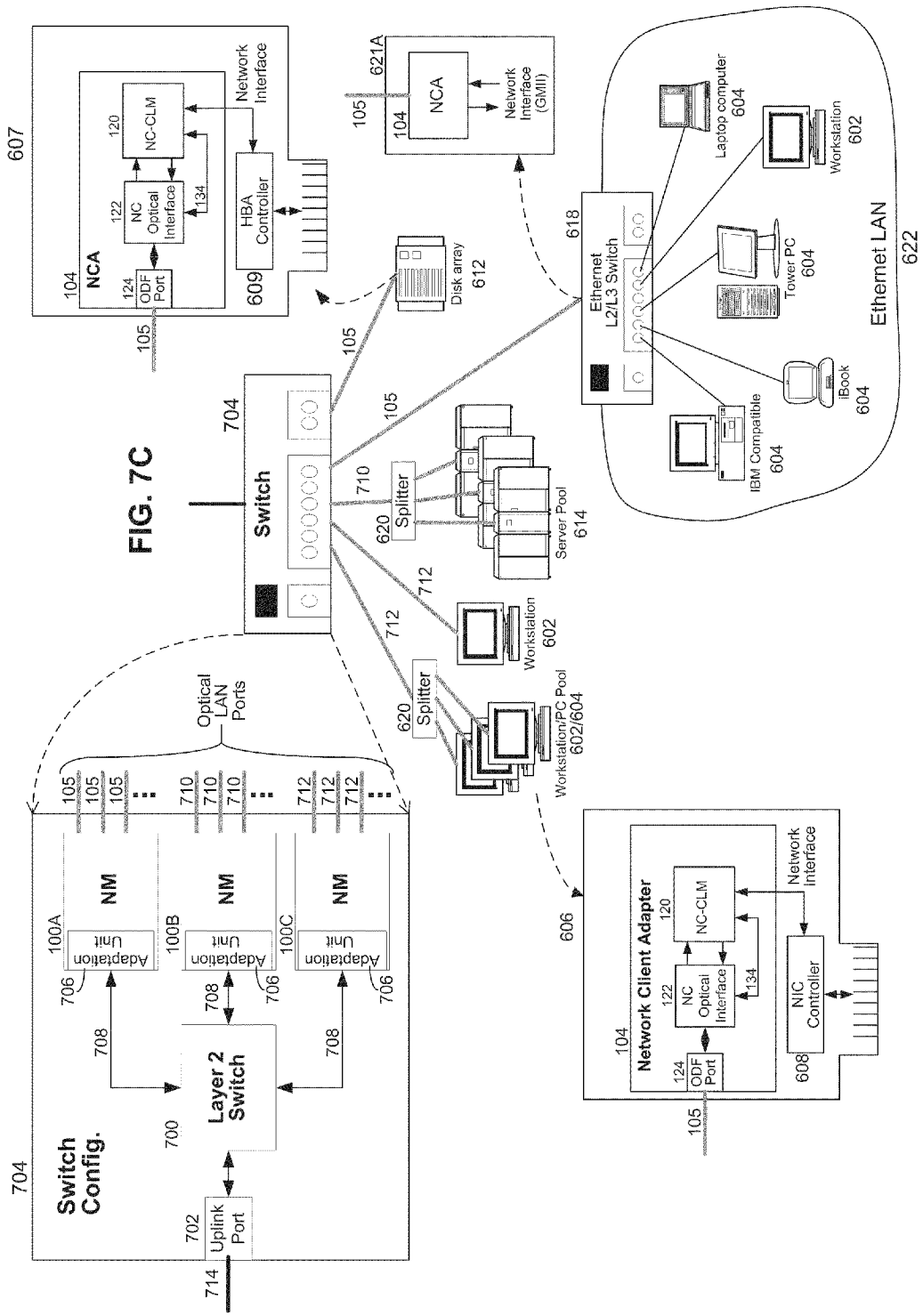

In yet another implementation of an optical local area network 50 shown in FIG. 7C, a switch configuration 704 is used to network workstations 602, PCs 604, disk storage array devices 612, servers 614 and other switches (e.g. an Ethernet switch 618) together using, for example, both Ethernet and FC protocols concurrently in a manner described previously. The switch configuration 704 includes a Layer-2 switch (e.g. Layer-2 switch device 700) that implements both an Ethernet MAC and FC-2 controller with switching functions. Layer-2 switch device 700 can be implemented by a packet processor or network processor. The optical fibers 105, 710, 712 connecting the workstations 602, PCs 604, disk storage array devices 612, servers 614 and t switches to the switch configuration 704 can be associated with different NMs 100A, 100B, 100C depending on which fiber connections are used. The uplink port 702 of switch configuration 704 may connect to an Ethernet or FC-2 switch and/or router (not shown).

Figure 7D:
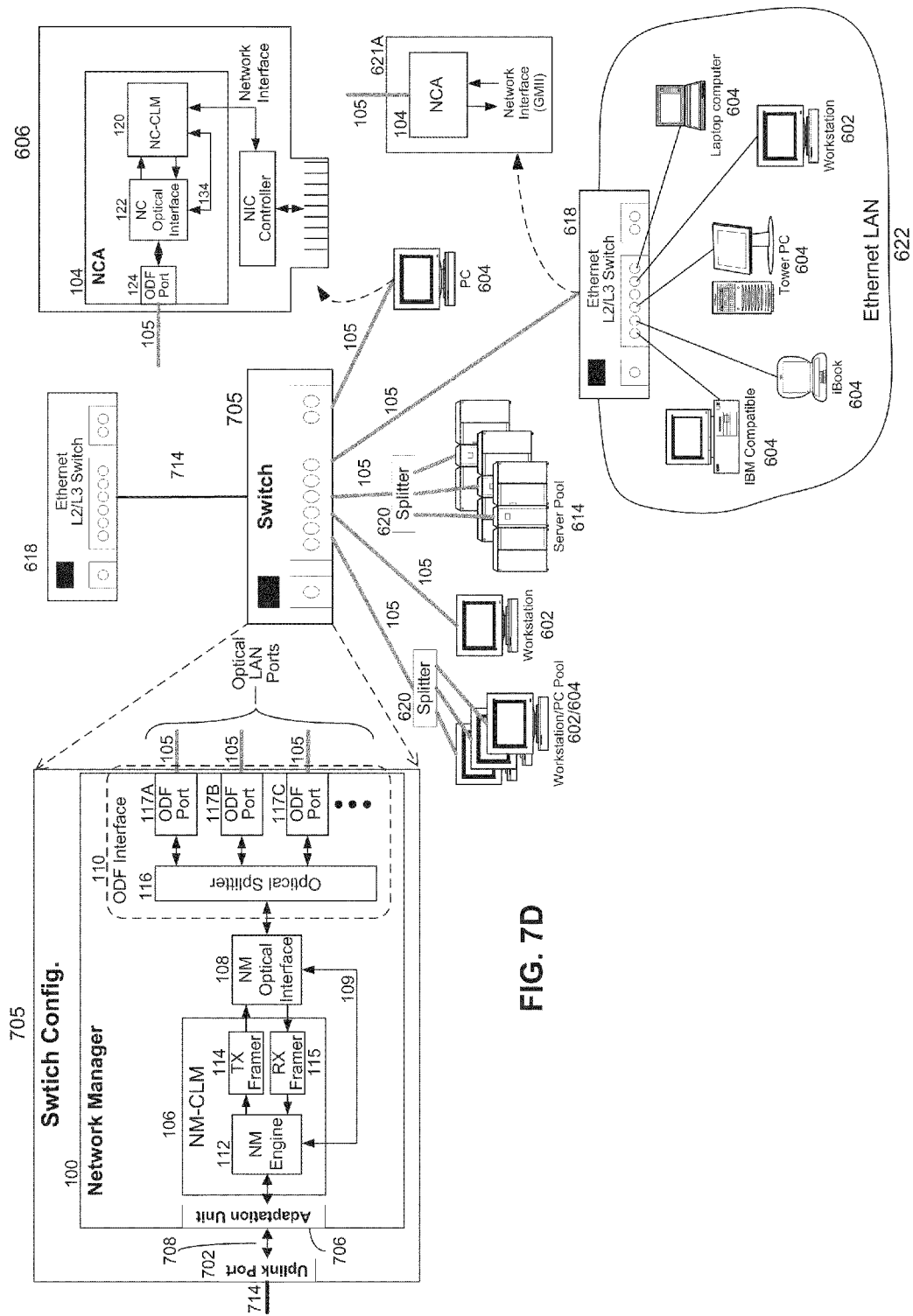

In yet another implementation of an optical local area network 50, an implementation of switch configuration 705 containing an NM 100, an adaptation unit 706 and an uplink port 702 is shown in FIG. 7D. Switch configuration 705 can be used to network workstations 602, PCs 604 and other switches 618 in a manner described previously. The NM 100 is in communication with a Layer-2 switch device (not shown) through the uplink port 702 that is connected to a switch. The connection between uplink port 702 and switch 618 can be a physical layer connection 714 (e.g., 1000 BASE-SX, 1000 BASE-LX). Ethernet switch 618 can be a conventional Ethernet switch.

In some implementations of switch configurations 704, 705 the uplink port 702 can be an NCA adaptor (not shown) similar to 621A, 621B wherein the network interface 136 and switch interface 708 are coupled using the same interface standard (e.g., XAUI, Serial, Parallel), thus enabling the uplink port 702 to connect to other hub configurations 600 and switch configurations 704 (FIGS. 7A-7C), 705 (FIG. 7D).

Figure 8:
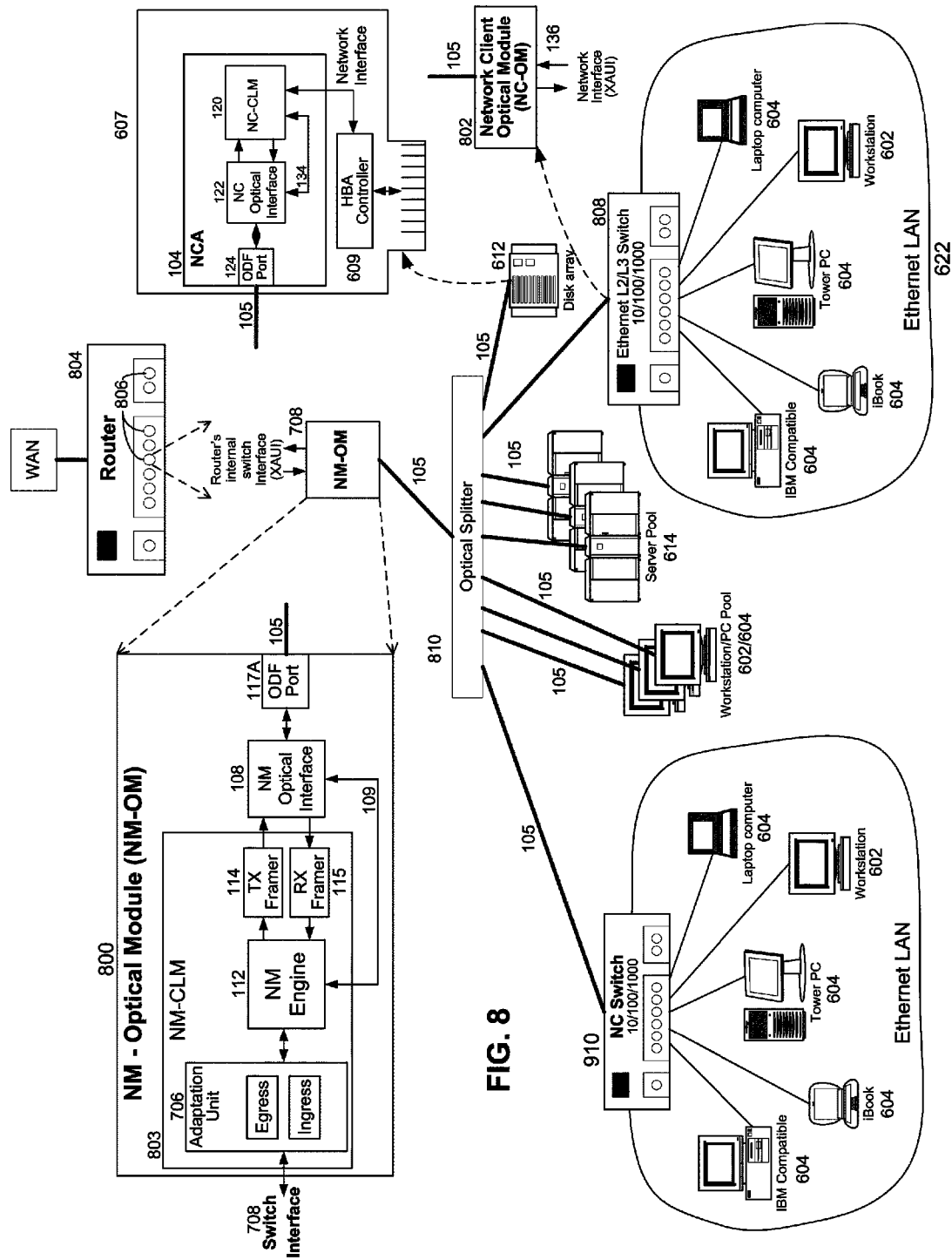
FIG. 8 is a diagram of an optical local area network.
Figure 11:
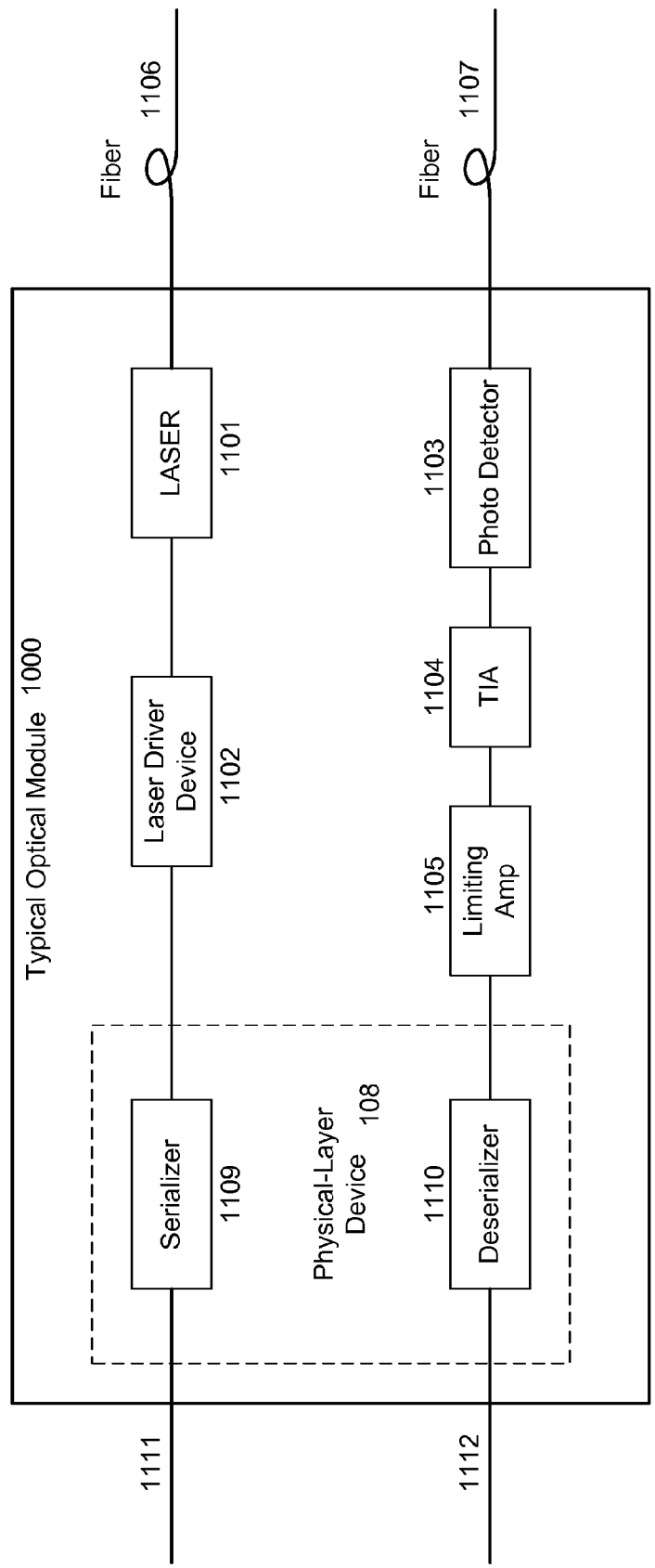
FIG. 11 is a diagram representing a typical optical module and components.
Figure 12:
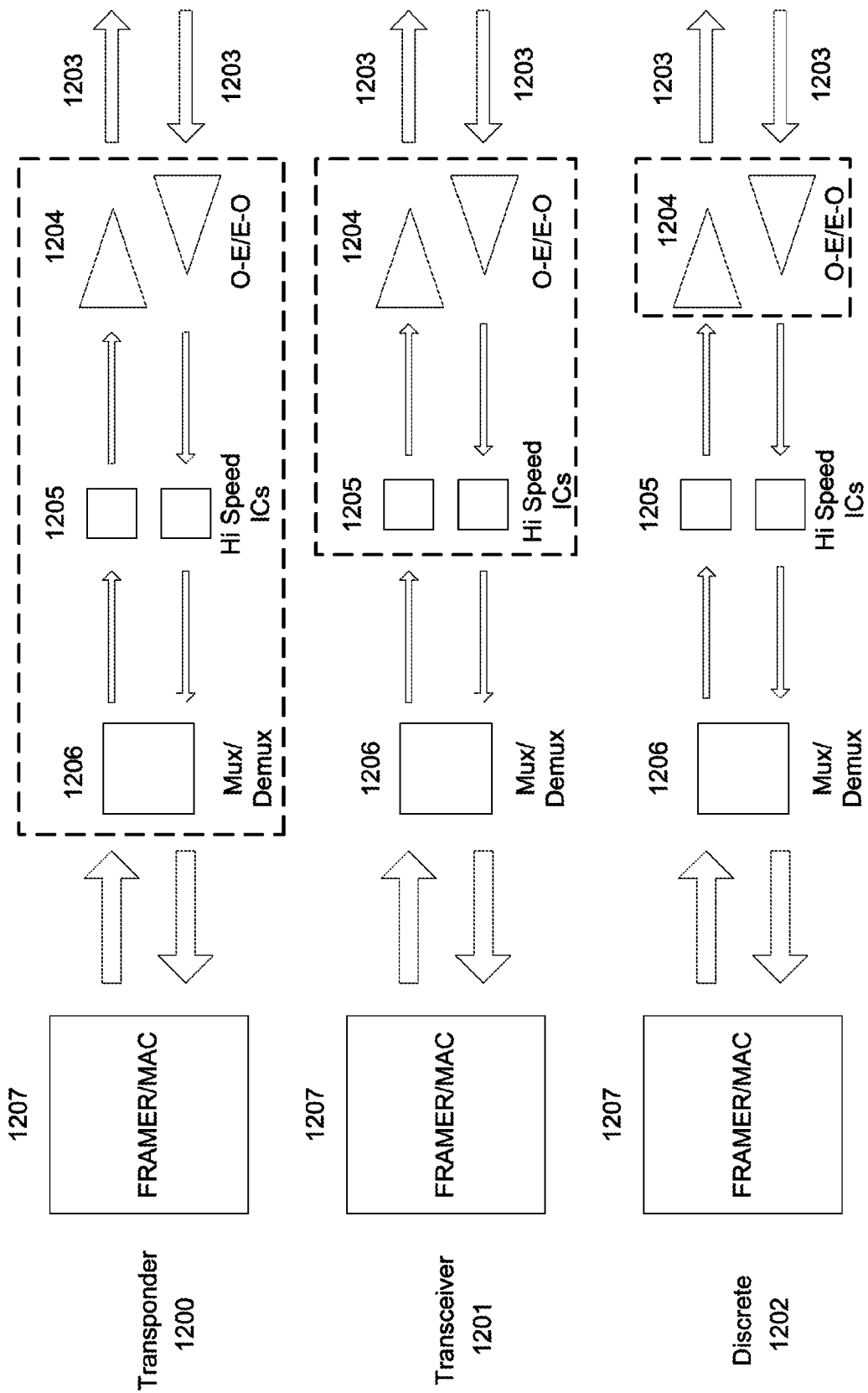
FIG. 12 is a diagram illustrating the basic components of transponder, transceiver and discrete optical modules.
Figure 13:
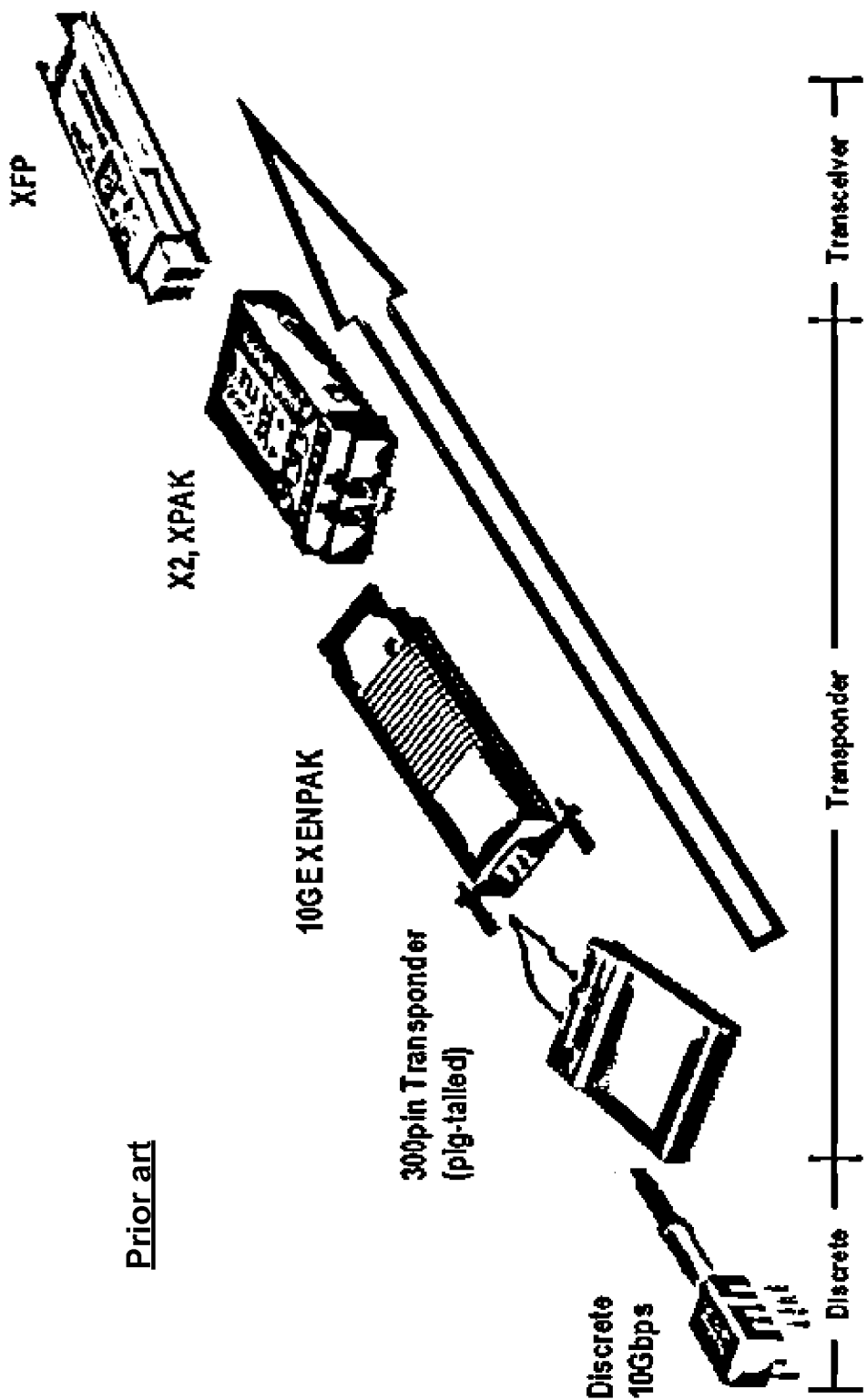
FIG. 13 illustrates the evolutionary history of 10 Gb/s optical modules.

In another implementation of an optical local area network 50 shown in FIG. 8, NM 100 and NCA 104 may be implemented in optical modules. A network manager in an optical module (NM-OM) 800 is provided that, in one implementation, conforms to an industry standard form factor and includes an NM-CLM 803 that includes an adaptation unit 706 to transfer data into and out of a network interface (e.g., switch interface 708). The NM-OM 800 also includes a NM Optical interface 108 and an ODF port 117A. In one implementation, the optical module NM-OM 800 conforms to an industry standard Multi-source agreement (MSA) form factor (e.g., 300pin, XENPAK, X2, XPAK, XFP or SFP). A network client adaptor in an optical module (NC-OM) 802 can be provided that, in one implementation, also conforms to an industry standard form factor and includes an NCA 104. For example, the optical module NC-OM may conform to an MSA form factor (e.g., 300pin, XENPAK, X2, XPAK, XFP or SFP).

The NM-OM 800 can connect to a conventional router 804 that has optical module ports 806 using the router's switch interface (e.g., XAUI or Serial). The NM-OM 800 is in optical communication with an optical splitter 810 that splits light among and collects light from workstations 602, PCs 604, disk storage array devices 612, servers 614 and switches using appropriate NICs 606 and/or NC-OM 802 as previously described. The Ethernet Layer-2/3 switch 808 may be of conventional design and include an uplink port, that in one implementation, conforms to an industry standard optical module form factor. The Ethernet Layer-2/3 switch 808 can communicate with the NM-OM 800 in router 804 by using an NC-OM 802 via network interface 136 (e.g., XAUI or Serial).

Figures 9, 10:
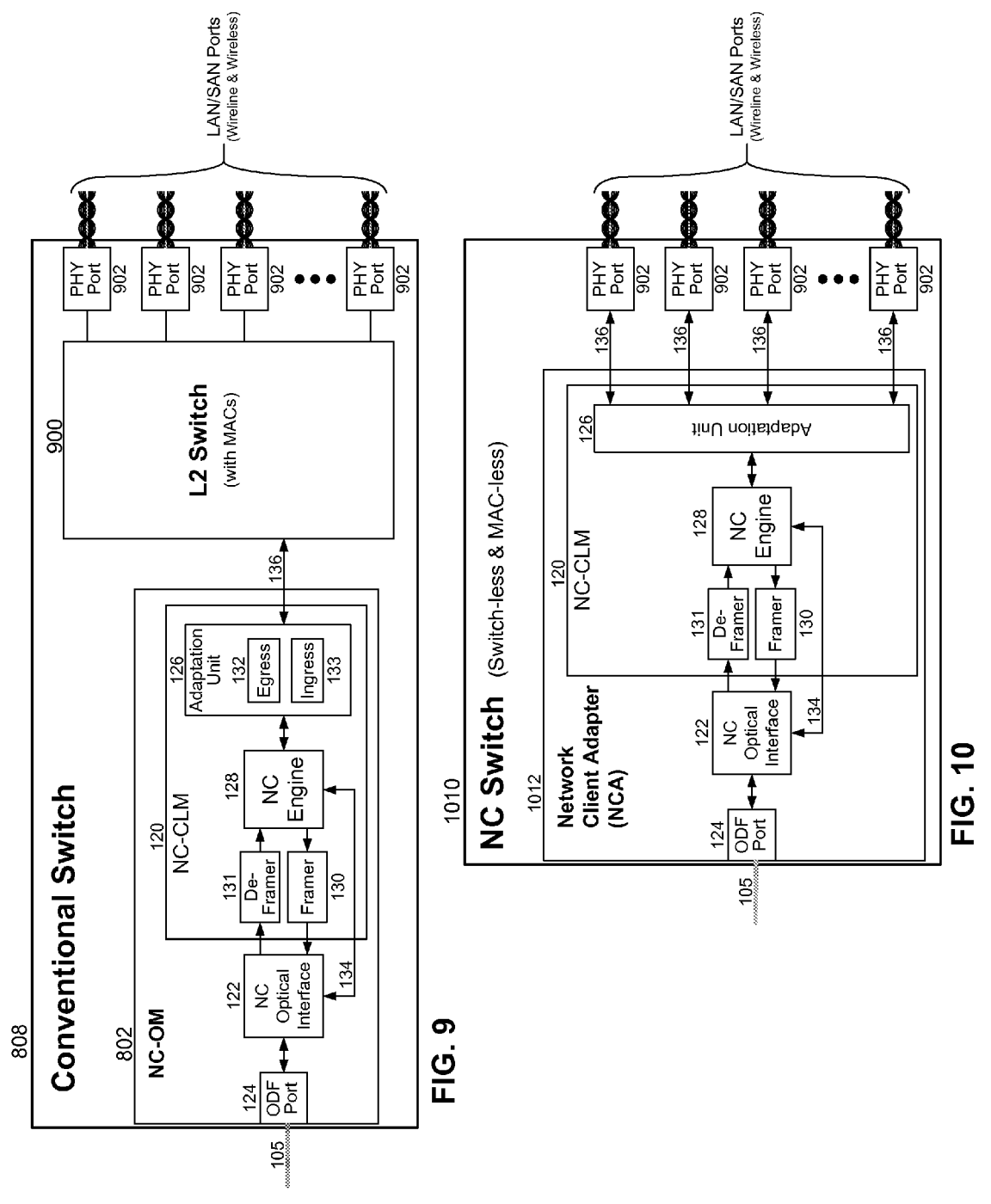

The Ethernet Layer-2/3 switch 808 is further detailed in FIG. 9. In the Ethernet Layer-2/3 switch 808, an NC-OM 802 is in communication with a Layer-2 switch 900 by means of a MAC (not shown) using a network interface 136 (e.g., XAUI or Serial). Ethernet Layer-2/3 switch 808 also includes physical layer ports (PHY ports) 902 that, in one implementation, form a conventional Ethernet LAN (e.g., Ethernet LAN 622 of FIG. 8) connecting network clients such as workstations 602 and PCs 604.

An implementation of an alternative configuration for a switch is shown in FIG. 10. FIG. 10 is an illustration of an NC-Switch 1010, in which no conventional Layer-2 switch and MAC is used. NC-Switch 1010 includes an NCA 1012 and multiple PHY ports 902. Each PHY port may perform wireline (e.g., 10/100/1000 BASE-T, DSL) or wireless (e.g., IEEE 802.11, IEEE 802.16) physical layer communications with conventional LAN clients. In this implementation, the adaptation unit 126 supports multiple network interfaces 136. The switching function previously performed by the Layer-2 switch (e.g., Layer-2 switch 900 of FIG. 9) is consolidated to the switch or router in communication with an NM 100 in a switch configuration 704 (as described above) or an NM-OM 800 (e.g. as illustrated in FIG. 8 an NC-Switch 910 in communication with an NM-OM 800). Alternatively, the switching function previously performed by the Layer-2 switch is consolidated to Layer-2 switches (not shown) in communication with other NCAs 104 networked in a hub configuration 600.

In hub configuration 600 (e.g. FIGS. 6A-6C) of the optical local area network 50, flow control, denial of service and other network administration functions are dependent on external Layer-2 devices in communication with NCAs 104 (for example, the Ethernet MAC or FC-2 controller in the NIC controller 608 dependent on the implementation as previously discussed). In switch configurations 704 (e.g. FIGS. 7A-7C) of the optical local area network 50, flow control, denial of service and other network administration functions are further dependent on the external Layer-2 device 700 in communication with NMs 100, in addition to the Layer-2 devices external and in communication with NCAs 104 as previously mentioned.

Figure 14:
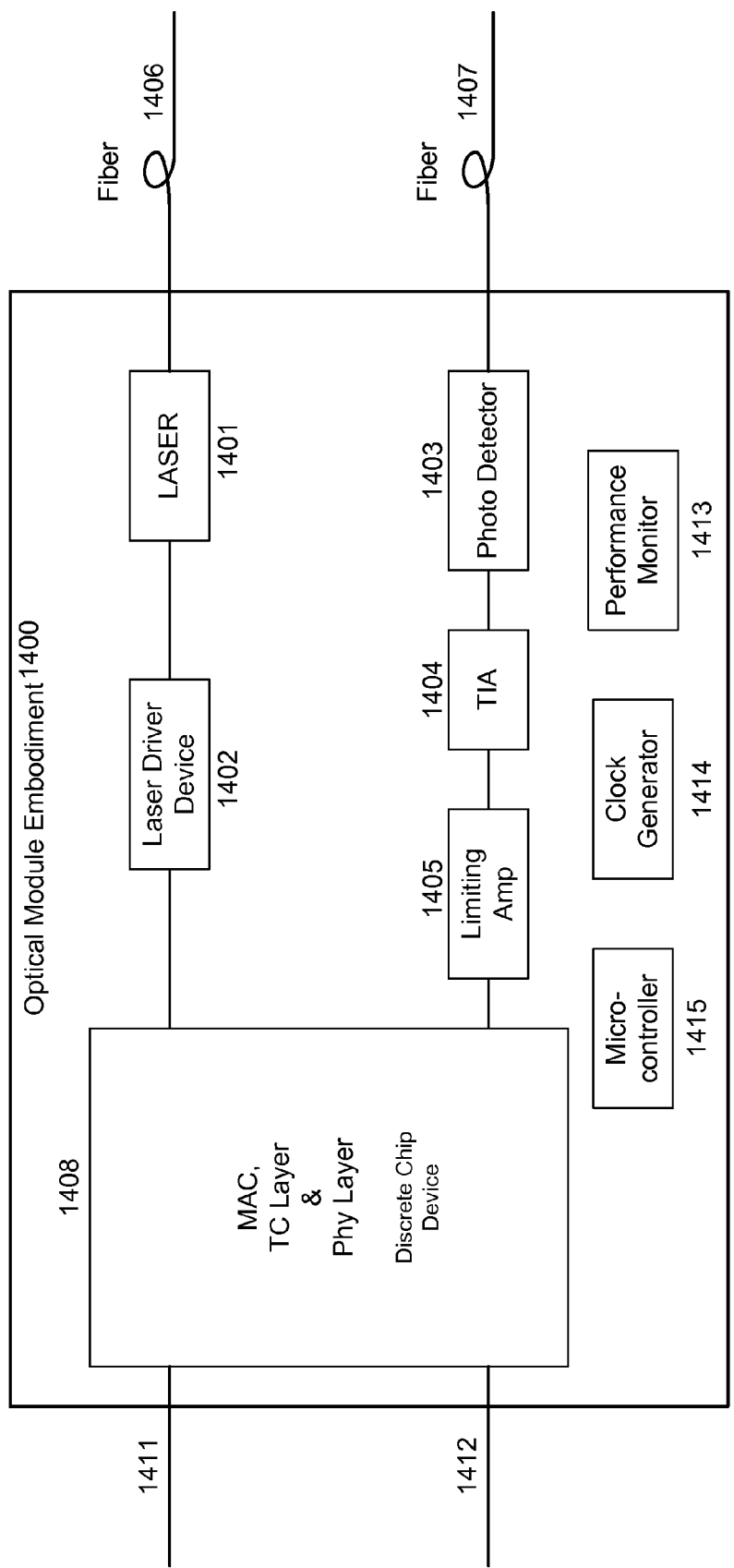
FIG. 14 is a diagram of an optical module with MAC, TC-Layer and PHY-Layer components according to an exemplary embodiment of the invention.

FIG. 14 is a diagram of an optical module 1400 with MAC, TC-Layer and PHY-Layer functionality components 1408 according to an exemplary embodiment of the invention. The form factor of the optical module 1400 can comply with any current or future optical module form factor. The preferred embodiment of the invention would have a form factor that complies with an MSA optical module such as the XENPAK, X2, SFP and XFP MSA optical modules. The optical module 1400 contains the optical-electrical/electrical-optical components such as a laser 1401 and a photo detector 1403 as well as hi speed devices such as the laser driver 1402, TIA 1404 and limiting amp 1405. The MAC, TC-Layer and PHY-Layer functionality component(s) 1408 inside the optical module are the basis of the invention and are not to be confused with replacing the traditional MAC, TC-Layer and PHY-Layer devices that reside outside of optical modules. The MAC and TC-Layer comprise of functionality needed to generate and receive transmission frames and are responsible for the entire overhead associated with the transmission frame for a point-to-multipoint network. The invention is envisioned to enable point-to-multipoint connections in previously point-to-point only connections via passive optical network (PON) implementation. This implies a headend or Optical Line Terminal (OLT) MAC and TC-Layer, which must emulate the functionality of a point-to-point link and is the master of the point-to-multipoint link, with a complementary client or Optical Network Terminal (ONT) MAC and TC-Layer operating in a slave like relationship to the headend MAC & TC-Layer counterpart. The MAC performs the efficient arbitrating of downstream and upstream data by determining bandwidth allocation and packet destination on the point-to-multipoint network. The term TC-Layer originated with ATM protocol but has become and is used here to describe a specification that: bundles and unbundles sent and received data into packets or frames; manages the transmission of packets or frames on a network via medium access and bandwidth allocation; provides necessary messaging and end point behavior, and checks and corrects for errors. The PHY-Layer comprises the functionality of clock data recovery, analog to digital and digital to analog conversion. The preferred optical module embodiment would also contain a performance monitor 1413, clock generator 1414 and a micro-controller 1415. The performance monitor 1403 contains a photo diode and is used to monitor and correct the extinction ratio of the laser. The clock generator 1414 is a clock source for the various digital components in the preferred optical module embodiment 1400. The micro-controller 1415 enables the optical module 1400 to communicate to an external intelligence the capabilities of the optical module 1400 as well as receive configuration commands from the external intelligence. The input 1411 and output 1412 of the optical module 1400 can be either serial or parallel pins depending on the type of network apparatus that the optical module 1400 is intended to be connected to.

Figure 15:
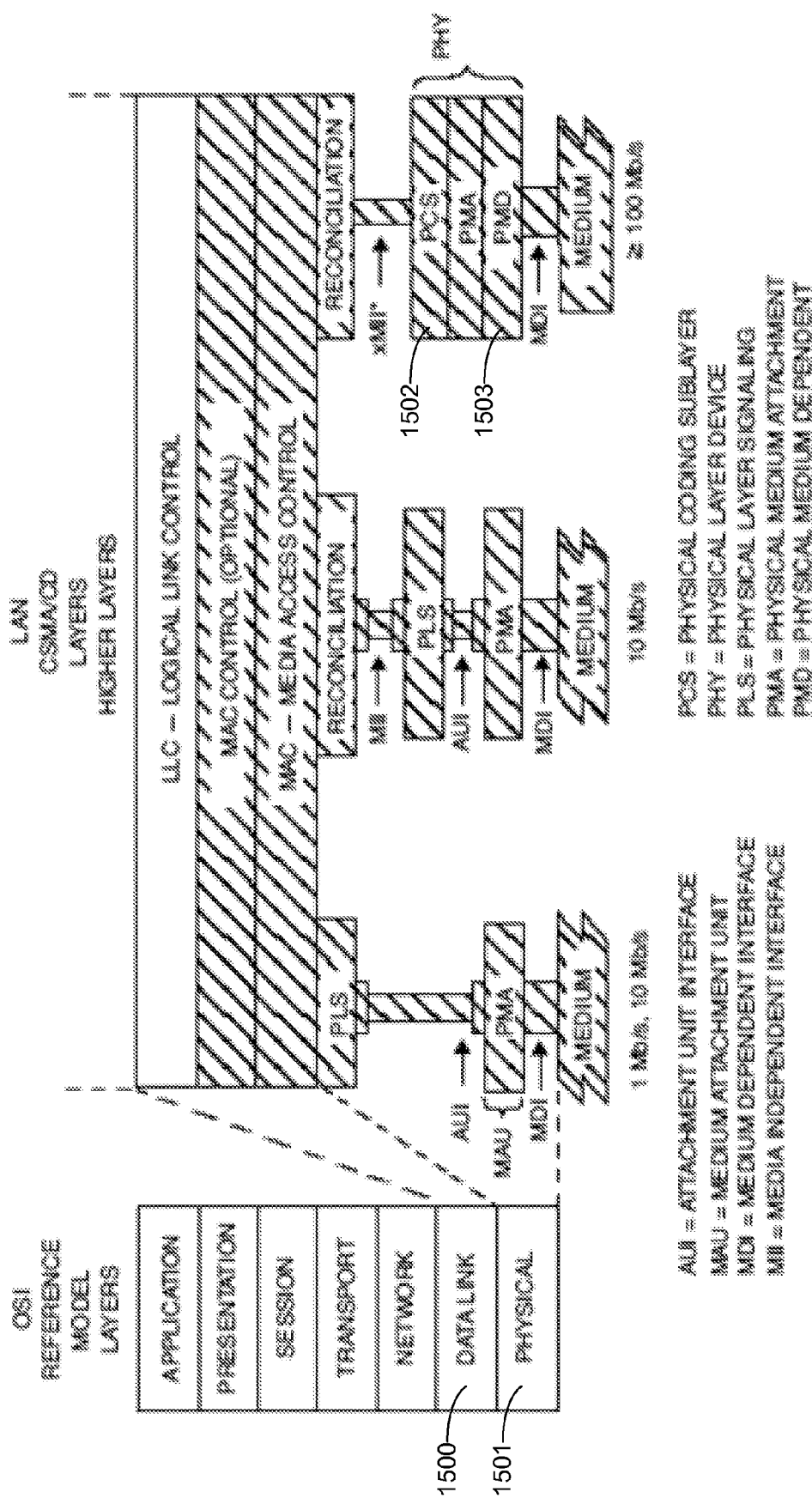
FIG. 15 is an illustration of the location of the invention in the Ethernet OSI model according to an exemplary embodiment of the invention.
Figure 16:
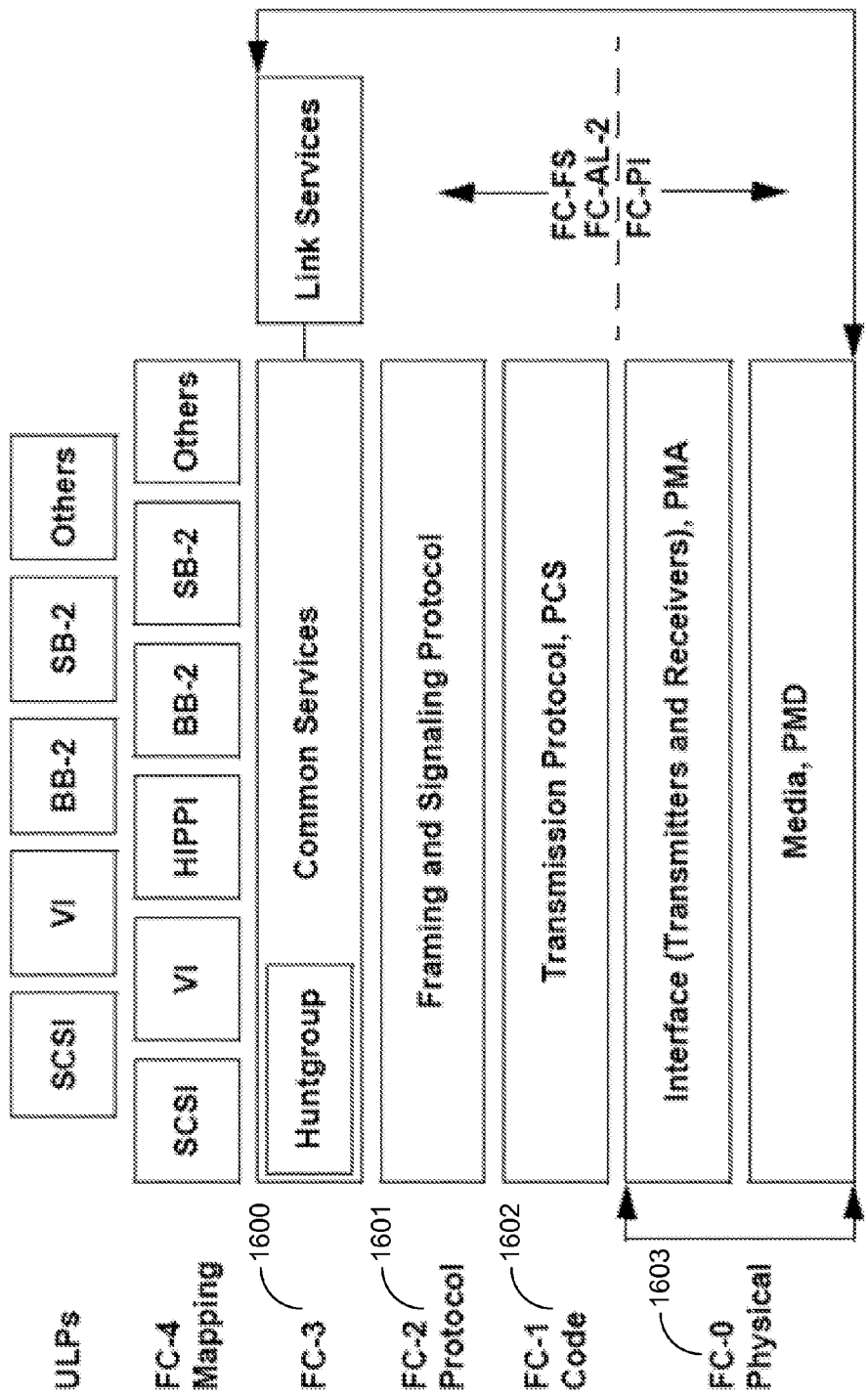
FIG. 16 is an illustration of the location of the invention in the Fiber Channel model structure according to an exemplary embodiment of the invention.

The optical module 1400 can connect to a plurality of network apparatus according to an exemplary embodiment of this invention. Given today's network infrastructure the invention is preferred to connect to Ethernet and Fibre Channel networks. FIG. 15 is a diagram of the Ethernet OSI model. The embodiment of the invention connects to Ethernet devices at two levels in the OSI model, as Physical Coding Sublayer (PCS) layer 1502 and Physical Media Dependent (PMD) layer 1503 devices. The embodiment connects to Ethernet devices as the PCS layer 1502 via an xMII type interface, which is a generic term for 100 Mbit or higher Media Independence Interfaces. FIG. 16 is a diagram of the Fibre Channel model structure and the embodiment of the invention connects to Fibre Channel devices at two levels in this structure model, as FC-1 layer 1602 and FC-0 layer 1603 devices. The embodiment connects to Fibre Channel devices as the FC-1 layer 1602 via the interface specified by the Fibre Channel specification, which as recently adopted an xMII interface as well.

Figure 17:
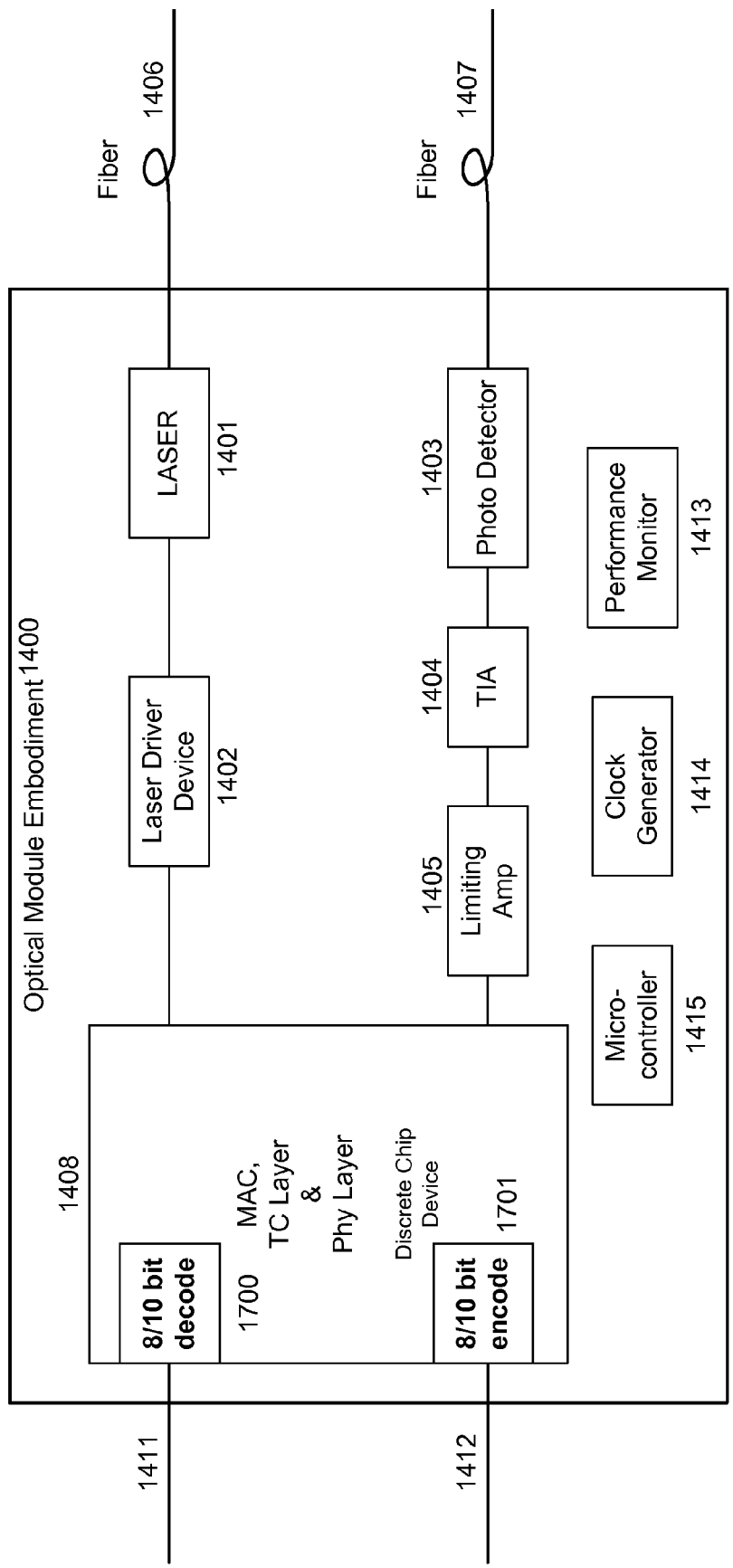
FIG. 17 is a diagram of an optical module according to an exemplary embodiment of the invention.

The embodiment connects to Ethernet devices as the PMD layer 1503 and Fibre Channel devices as the FC-0 layer 1603 via an MSA optical module port whereby the embodiment replaces an existing MSA optical module or is an outright substitute for traditional MSA optical modules. The embodiment in this case would have either serial or XAUI interface depending on the MSA form factor of the MSA optical module port. Furthermore, the embodiment in this case has the addition of 8/10 bit decode 1700 functionality as part of the MAC, as shown in FIG. 17. Both Ethernet and Fibre channel employ 8/10 bit encoding at the PCS layer. In order for the MAC to perform its functions part of the incoming data must be decoded to determine the destination of the packet on the point-to-multipoint network. The data is preferred to be sent with the 8/10 bit encoding to reduce the burden of complete decoding and recoding at the destination. Although in particular embodiments 8/10 bit decoding 1700 and encoding 1701 can be desired and done.

Quality of Service (QoS) in network designs has never been as important as it is today. Manageable QoS needs to be available at all levels of a network, including LAN, WAN, campus networks, enterprise networks, and metropolitan networks. QoS management should be provided at all layers of the network protocol, or the QoS is only as good as the weakest link. QoS is usually implemented via Station Management interfaces with Management Information Base (MIB) table of registers to manipulate the network device. The embodiments of the invention enable a new level of QoS management at the PCS and PMD layers or the equivalent there of. QoS can be enabled via a Station Management interface with the micro-controller 1415 where the MIB resides.

Although the invention has been described in terms of particular implementations, one of ordinary skill in the art, in light of this teaching, can generate additional implementations and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A network client optical transceiver module for a passive optical network, the passive optical network having one or more passive optical splitters for coupling the network client optical transceiver module over one or more optical fibers to the head end of the passive optical network and the network client optical transceiver module having a pluggable form factor and configured to removably couple to an optical module port of a switch or router, the network client optical transceiver module comprising:

an optical port configured to optically couple to one or more optical fibers of the passive optical network having one or more passive optical splitters;

a bi-directional optical interface block optically coupled to the optical port and configured to perform optical-to-electrical and electrical-to-optical signal conversion;

a control module electrically coupled to the bi-directional optical interface block and configured to receive from the head end of the passive optical network data communications representing one or more start times for transmitting data communications to the head end of the passive optical network and configured to transmit the data communications to the head end of the passive optical network responsive to the start times; and an electrical network interface port electrically coupled to the control module and for electrically coupling into the optical module port of the switch or router and for communicating with the switch or router; whereby the network client optical transceiver module is configured to optically communicate with the head end of the passive optical network responsive to start times for transmitting data communications to the head end of the passive optical network and the network client optical transceiver module is configured to removably couple to the optical module port of the switch or router and electrically communicate with the switch or router.

2. The network client optical transceiver module of claim 1, wherein the pluggable form factor of the network client optical transceiver module is selected from the group consisting essentially of:
Small Form-factor Pluggable (SFP);
10 Gigabit Small Form-factor Pluggable (XFP);
XENPAK;
X2; and
XPAK.

3. The network client optical transceiver module of claim 1, wherein the control module is configured to receive from the head end of the passive optical network data communications representing one or more end times for transmitting data communications to the head end of the passive optical network and the control module is configured to end transmissions to the head end of the passive optical network response to the end times.

4. The network client optical transceiver module of claim 1, wherein the control module is configured to receive from the head end of the passive optical network data communications representing one or more lengths of times respectively to the start times for transmitting data communications to the head end of the passive optical network and the control module is configured to transmit to the head end of the passive optical network response to the lengths of times.

5. The network client optical transceiver module of claim 1, wherein the optical port is adapted to optically couple to one or more optical fibers selected from the group consisting of:
multimode optical fibers; and
single mode optical fibers.

6. The network client optical transceiver module of claim 1, wherein the optical port includes one or more optical fiber connectors and the optical fiber connectors are selected from the group consisting essentially of:
Subscriber Connector (SC);
Lucent Connector (LC);
Fiber Channel (FC);
Straight TP (ST); and
Miniature Unit (MU).

7. The network client optical transceiver module of claim 1, wherein the electrical network interface port includes an interface selected from the group consisting essentially of:
a serial interface;
a parallel interface; and
a XAUI interface.

8. The network client optical transceiver module of claim 1, wherein the network client optical transceiver module includes a framing block electrically coupled to the bi-directional optical interface block and the control module is electrically coupled to the framing block and wherein the framing block is configured for framing data communications for transmission in accordance with a framing protocol for the passive optical network.

9. The network client optical transceiver module of claim 1, wherein the control module is configured to receive from the head end of the passive optical network an assigned network identification address and wherein the assigned network identification address can be used for receiving data addressed to the network client optical transceiver module.

10. The network client optical transceiver module of claim 1, wherein the control module is configured to respond to the head end of the passive optical network responsive to a network operating protocol for new network clients.

11. The network client optical transceiver module of claim 1, wherein the control module is configured to respond to a response delay message from the head end of the passive optical network, wherein the response delay message is used to determine the delay in responses from the network client optical transceiver module.

12. The network client optical transceiver module of claim 1, wherein the control module is configured to align data communication transmissions with the network period of the optical network to account for transmission delays responsive to a response delay process.

13. The network client optical transceiver module of claim 1, wherein the control module is configured to adjust the transmitting optical power level responsive to a message received from the head end of the passive optical network.

14. The network client optical transceiver module of claim 1, wherein the control module is configured to encapsulate at least a portion of the data received through the electrical network interface port into a payload section of a framing protocol for the passive optical network.

15. The network client optical transceiver module of claim 1, wherein the network client optical transceiver module includes one or more of the following:
a laser;
a laser driver;
a photodiode;
a transimpedance amplifier; and
a limiting amplifier.

16. The network client optical transceiver module of claim 1, wherein the network client optical transceiver module is an optical network terminal (ONT) and includes a discrete chip selected from the group consisting essentially of:
a media access controller (MAC) discrete chip; and
a transmission convergence layer (TC-Layer) discrete chip.

17. The network client optical transceiver module of claim 1, wherein the network client optical transceiver module includes 8/10 bit encoding for communications sent and 8/10 bit decoding for communications received through the electrical network interface port.

18. A network client optical transceiver module for a passive optical network, the passive optical network having one or more passive optical splitters for coupling the network client optical transceiver module over one or more optical fibers to the head end of the passive optical network and the network client optical transceiver module having a pluggable form factor and adapted to removably couple to an optical module port of a switch or router, and the network client optical transceiver module having an optical port for coupling to one or more optical fibers of the passive optical network, and the network client optical transceiver module having an optical interface block optically coupled to the optical port and for converting electrical signals to optical signals and for converting optical signals to electrical signals, and the network client optical transceiver module having a control module electrically coupled to the optical interface block and for communicating with the head end of the passive optical network, and the network client optical transceiver module having an electrical network interface port electrically coupled to the control module and for electrically communicating to the switch or router, a method of communicating with the head end of a passive optical network from the network client optical transceiver module comprising the steps of:

(a) receiving data from the switch or router through the electrical network interface port of the network client optical transceiver module;

(b) storing the received data inside the network client optical transceiver module;

(c) receiving a first optical signal from the head end of the passive optical network through the optical port at the optical interface block of the network client optical transceiver module;

(d) converting the first optical signal to an electrical signal at the optical interface block and conveying the electrical signal to the control module of the network client optical transceiver module;

(e) processing the electrical signal at the control module to determine one or more start times for data transmissions from the network client optical transceiver module to the head end of the passive optical network;

(f) converting a portion of the stored received data to a second optical signal; and (g) transmitting the second optical signal from the optical interface block through the optical port responsive to the one or more start times for data transmissions to the head end of the passive optical network; whereby the network client optical transceiver module optically communicates with the head end of the passive optical network responsive to start times for data transmissions and the network client optical transceiver module electrically communicates with the switch or router.

19. The method of claim 18, wherein the pluggable form factor of the optical transceiver module is selected from the group consisting essentially of:
SFP;
XFP;
XENPAK;
X2; and
XPAK.

20. The method of claim 18, further comprising the steps of:
(e1) processing the electrical signal at the control module to determine one or more end times for data transmissions from the network client optical transceiver module to the head end of the passive optical network; and
(g1) terminating the transmission of the second optical signal responsive to an end time for data transmissions to the head end of the passive optical network.

21. The method of claim 18, further comprising the steps of:
(e1) processing the electrical signal at the control module to determine one or more lengths of times respective to the start times for data transmissions from the network client optical transceiver module to the head end of the passive optical network; and
(g1) transmitting the second optical signal responsive to a length of time for data transmissions to the head end of the passive optical network.

22. The method of claim 18, wherein the optical port is adapted to optically couple to one or more optical fibers selected from the group consisting of:
multimode optical fibers; and
single mode optical fibers.

23. The method of claim 18, wherein the optical port includes one or more optical fiber connectors and the optical fiber connectors are selected from the group consisting essentially of:
SC;
LC;
FC;
ST; and
MU.

24. The method of claim 18, wherein the electrical network interface port includes an interface selected from the group consisting essentially of:
a serial interface;
a parallel interface; and
a XAUI interface.

25. The method of claim 18, further comprising the step of:
(e1) processing the electrical signal at the control module to determine an assigned network identification address from the head end of the passive optical network for addressing data to the network client optical transceiver module at the control module.

26. The method of claim 18, further comprising the step of:
(g1) adjusting the transmission of the second optical signal from the optical interface block through the optical port to account for the response delay of the optical transceiver module.

27. The method of claim 18, further comprising the step of:
(e1) processing the electrical signal at the control module to determine an optical power level and adjusting the transmit optical power level of the network client optical transceiver module to the determined optical power level.

28. The method of claim 18, further comprising the step of:
(f1) encapsulating a portion of data received through the electrical network interface port into the payload section of a framing protocol for the passive optical network at the control module for conveyance to the optical interface block.

29. The method of claim 18, wherein the network client optical transceiver module includes one or more of the following:
a laser;
a laser driver;
a photodiode;
a transimpedance amplifier; and
a limiting amplifier.

30. The method of claim 18, wherein the network client optical transceiver module is ONT and includes a discrete chip selected from the group consisting essentially of:
a MAC discrete chip; and
a TC-Layer discrete chip.

31. The method of claim 18, further comprising the steps of:
(b1) performing 8/10 bit decoding on the received data; and
(h) performing 8/10 bit encoding on data sent through the electrical network interface port.

32. A head end optical transceiver module for a passive optical network, the passive optical network having one or more passive optical splitters for coupling one or more optical network clients over one or more optical fibers to the head end optical transceiver module and the head end optical transceiver module having a pluggable form factor and configured to removably couple to an optical module port of a switch or router, the head end optical transceiver module comprising:
an optical port configured to optically couple to one or more optical fibers of the passive optical network having one or more passive optical splitters;

a bi-directional optical interface block optically coupled to the optical port and configured to perform optical-to-electrical and electrical-to-optical signal conversion;

a control module electrically coupled to the optical interface block and configured to communicate with one or more optical network clients as the head end of the passive optical network and configured to allocate and transmit data representing one or more start times for communication transmissions from one or more optical network clients to the optical network clients; and an electrical network interface port electrically coupled to the control module and for electrically coupling into the optical module port of the switch or router and for communicating with the switch or router; whereby the head end optical transceiver module is configured to optically communicate across the passive optical network with the optical network clients and manage the communications of one or more optical network clients by allocating and transmitting data representing start times for optical network client transmissions and the head end optical transceiver module is configured to removably couple to the optical module port of the switch or router and configured to electrically communicate with the switch or router.

33. The head end optical transceiver module of claim 32, wherein the pluggable form factor of the head end optical transceiver module is selected from the group consisting essentially of:
SFP;
XFP;
XENPAK;
X2; and
XPAK.

34. The head end optical transceiver module of claim 32, wherein the control module is configured to allocate and send data communications representing one or more end times respectively to the start times for transmitting data communications from a network client to the head end of the passive optical network.

35. The network client optical transceiver module of claim 32, wherein the control module is configured to allocate and send data communications representing one or more lengths of times respectively to the start times for transmitting data communications from a network client to the head end of the passive optical.

36. The head end optical transceiver module of claim 32, wherein the optical port is adapted to optically couple to one or more optical fibers selected from the group consisting of:
multimode optical fibers; and
single mode optical fibers.

37. The head end optical transceiver module of claim 32, wherein the optical port includes one or more optical fiber connectors and the optical fiber connectors are selected from the group consisting essentially of:
SC;
LC;
FC;
ST; and
MU.

38. The head end optical transceiver module of claim 32, wherein the electrical network interface port includes an interface selected from the group consisting essentially of:
a serial interface;
a parallel interface; and
a XAUI interface.

39. The head end optical transceiver module of claim 32, wherein the head end optical transceiver module includes a framing block electrically coupled to the bi-directional optical interface block and the control module is electrically coupled to the framing block and wherein the framing is configured for framing data for transmission in accordance with a framing protocol for the passive optical network.

40. The head end optical transceiver module of claim 32, wherein the control module is configured to assign and transmit a network identification address for an optical network client of the passive optical network for addressing data to the optical network client.

41. The head end optical transceiver module of claim 32, wherein the control module is configured to transmit a message to new optical network clients on the passive optical network wherein the message requests the new optical network clients to identify themselves to the head end optical transceiver module.

42. The head end optical transceiver module of claim 32, wherein the control module is configured to transmit a response delay message to a optical network client of the passive optical network, wherein the response delay message is used to determine the delay in responses from the optical network client.

43. The head end optical transceiver module of claim 32, wherein the control module is configured to allocate start times for optical network client transmissions to guarantee a minimum transfer rate from the optical network clients and wherein the minimum transfer rate can be determined by dividing the maximum receive rate of the head end optical transceiver module by the number of optical network clients.

44. The head end optical transceiver module of claim 32, wherein the control module is configured to allocate start times for optical network client transmissions to minimize the depth of the memory buffer queues of optical network clients wherein the control module receives status information representing the optical network client memory buffer queues.

45. The head end optical transceiver module of claim 32, wherein the control module is configured to send a request to adjust transmit optical power levels in a message to an optical network client.

46. The head end optical transceiver module of claim 32, where the control module is configured to encapsulate at least a portion of the data received through the electrical network interface port into a payload section of a framing protocol for on the passive optical network.

47. The head end optical transceiver module of claim 32, wherein the head end optical transceiver module includes one or more of the following:
a laser;
a laser driver;
a photodiode;
a transimpedance amplifier; and
a limiting amplifier.

48. The head end optical transceiver module of claim 32, wherein the head end optical transceiver module is an optical line terminal (OLT) and includes a discrete chip selected from the group consisting essentially of:
a MAC discrete chip; and
a TC-Layer discrete chip.

49. A head end optical transceiver module for the head end of a passive optical network, the passive optical network having one or more passive optical splitters for coupling one or more optical network clients over one or more optical fibers to the head end optical transceiver module and the head end optical transceiver module having a pluggable form factor and adapted to removably couple to an optical module port of a switch or router, the head end optical transceiver module having an optical port for coupling to one or more optical fibers of the passive optical network, and the head end optical transceiver module having an optical interface block optically coupled to the optical port and for converting electrical signals to optical signals and for converting optical signals to electrical signals, and the head end optical transceiver module having a control module electrically coupled to the optical interface block and for communicating with optical network clients on the passive optical network, and the head end optical transceiver module having an electrical network interface port electrically coupled to the control module and for electrically communicating to the switch or router, a method of allocating start times to optical network clients by the head end optical transceiver module for communication transmissions from the optical network clients comprising the steps of:

(a) allocating one or more start times for communication transmissions from an optical network client at the control module of the head end optical transceiver module;

(b) generating a first message containing information representing the allocated start times for communication transmissions from an optical network client at the control module;

(c) addressing the first message to the optical network client at the control module;

(d) conveying the first message to the optical interface block of the head end optical transceiver module;

(e) converting the first message to a first optical signal at the optical interface block; and (f) transmitting the first optical signal from the optical interface block through the optical port of the head end optical transceiver module;

(g) receiving a second optical signal from the optical network client responsive to the first message containing information representing the allocated start times through the optical port and at the optical interface block;

(h) converting the second optical signal to an electrical signal at the optical interface block; and (i) conveying a portion of the electrical signal to the switch or router through the electrical network interface by the control module of the head end optical transceiver module; whereby the head end optical transceiver module manages optical communications across the passive optical network by allocating start times for optical network clients to transmit optical communications and the head end optical transceiver module electrically communicates with the switch or router.

50. The method of claim 49, wherein the pluggable form factor of the head end optical transceiver module is substantially the same form factor selected from the group consisting essentially of:
 SFP;
 XFP;
 XENPAK;
 X2; and
 XPAK.

51. The method of claim 49, further comprising the steps of:

(b) generating a first message containing information representing the allocated start times and end times for communication transmissions from an optical network client at the control module; and (g) receiving a second optical signal from the optical network client responsive to the first message containing information representing the allocated start times and end times through the optical port and at the optical interface block.

52. The method of claim 49, further comprising the steps of:

(b) generating a first message containing information representing the allocated start times and length of times for communication transmissions from an optical network client at the control module; and (g) receiving a second optical signal from the optical network client responsive to the first message containing information representing the allocated start times and length of times through the optical port and at the optical interface block.

53. The method of claim 49, wherein the optical port is adapted to optically couple to one or more optical fibers selected from the group consisting of:
 multimode optical fibers; and
 single mode optical fibers.

54. The method of claim 49, wherein the optical port includes one or more optical fiber connector sockets and the optical fiber connector sockets are selected from the group consisting essentially of:
 SC;
 LC;
 FC;
 ST; and
 MU.

55. The method of claim 49, wherein the electrical network interface port includes an interface selected from the group consisting essentially of:
 a serial interface;
 a parallel interface; and
 a XAUI interface.

56. The method of claim 49, wherein the conveying a portion of the electrical signal to the switch or router includes adapting the portion of the electrical signal in accordance to an OSI Layer 2 protocol by the control module.

57. The method of claim 49, further comprising the steps of:

(a) assigning a network identification address to an optical network client for addressing data to the optical network client at the control module; and (b) transmitting the network identification address to the optical network client from the optical interface block and through the optical port.

58. The method of claim 49, further comprising the step of:

(j) generating a second message for new optical network clients on the passive optical network at the control module wherein the second message requests the new optical network clients to identify themselves to the head end optical transceiver module; and (k) transmitting the second message from the optical interface block through the optical port to the new optical network clients on the passive optical network.

59. The method of claim 49, further comprising the step of:

(j) generating a response delay message for an optical network client of the passive optical network at the control module, wherein the response delay message is used to determine the delay in responses from the optical network client; and (k) transmitting the response delay message to an optical network client of the passive optical network from the optical interface block and through the optical port.

60. The method of claim 49, wherein the allocating start times for communication transmissions from an optical network client includes allocating start times to an optical network client to guaranteed a minimum transfer rate from the optical network client and wherein the minimum guaranteed transfer rate can be determined by dividing the maximum receive rate of the head end optical transceiver module by the number of optical network clients.

61. The method of claim 49, wherein allocating start times for communication transmissions from an optical network client includes allocating start times to an optical network client to minimize the depth of the memory buffer queue of the optical network client wherein the head end optical transceiver module receives status information representing the optical network client memory buffer queue.

62. The method of claim 49, further comprising the steps of:

(j) generating a second message for an optical network client on the passive optical network at the control module wherein the second message requests the optical network client to adjust transmit optical power levels; and (k) transmitting the second message from the optical interface block through the optical port to the optical network clients on the passive optical network.

63. The method of claim 49, further comprising the steps of:

(j) receiving data through the electrical network interface port;

(k) converting a portion of the data received into the payload section of a framing protocol for the passive optical network; and (l) transmitting optically by the optical interface block the converted portion of data received through the electrical network interface port to an optical network client.

64. The method of claim 49, wherein the head end optical transceiver module includes one or more of the following:
a laser;
a laser driver;
a photodiode;
a transimpedance amplifier; and
a limiting amplifier.

65. The method of claim 49, wherein the head end optical transceiver module is an OLT and includes a discrete chip selected from the group consisting essentially of:
a MAC discrete chip; and
a TC-Layer discrete chip.

* * * * *